US010522900B2

(12) United States Patent
Khripkov et al.

(10) Patent No.: US 10,522,900 B2
(45) Date of Patent: Dec. 31, 2019

(54) WIRELESS COMMUNICATION DEVICE WITH LEAKY-WAVE PHASED ARRAY ANTENNA

(71) Applicant: Samsung Electronics Co., Ltd., Suwon-si, Gyeonggi-do (KR)

(72) Inventors: Alexander Nikolaevich Khripkov, Lobnya (RU); Gennadiy Alexandrovich Evtyushkin, Moscow (RU); Anton Sergeevich Lukyanov, Moscow (RU); Won-Bin Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/291,488

(22) Filed: Oct. 12, 2016

(65) Prior Publication Data

US 2017/0201011 A1 Jul. 13, 2017

(30) Foreign Application Priority Data

Jan. 11, 2016 (RU) ................................ 2016100229
Jul. 6, 2016 (KR) ........................ 10-2016-0085454

(51) Int. Cl.
*H01Q 13/20* (2006.01)
*H01Q 1/24* (2006.01)
(Continued)

(52) U.S. Cl.
CPC ............... *H01Q 1/243* (2013.01); *H01Q 1/38* (2013.01); *H01Q 1/42* (2013.01); *H01Q 1/50* (2013.01)

(58) Field of Classification Search
CPC ........... H01Q 1/243; H01Q 1/38; H01Q 1/42; H01Q 1/50; H01Q 3/443; H01Q 13/00;
(Continued)

(56) References Cited

U.S. PATENT DOCUMENTS 2,402,622 A * 6/1946 Hansen ..................... G01S 1/02 343/771
2,447,549 A * 8/1948 Willoughby .............. G01S 1/02 342/412
(Continued)

FOREIGN PATENT DOCUMENTS

CN 1111755 A 11/1995
CN 100492765 C * 6/2003 ............... H01Q 1/42
(Continued)

OTHER PUBLICATIONS

Constantine A. Balanis "Modern Antenna Handbook, Chapter 11, 2008".*
(Continued)

*Primary Examiner* — Daniel Munoz
*Assistant Examiner* — Bamidele A Jegede
(74) *Attorney, Agent, or Firm* — Jefferson IP Law, LLP

(57) ABSTRACT

A wireless communication device including an antenna device is provided. The wireless a communication device includes a housing having a conductive structure, a millimeter wave (mmWave) antenna having a plurality of antenna elements, the mmWave antenna being disposed within the housing, and a leaky-wave radiator having at least one opening formed in the conductive structure of the housing. An electromagnetic field generated by the mmWave antenna may be radiated outside of the housing of the wireless communication device through the leaky-wave radiator. The wireless communication device and/or an electronic device may be diversified according to embodiments.

18 Claims, 25 Drawing Sheets

(51) Int. Cl.
*H01Q 1/42* (2006.01)
*H01Q 1/38* (2006.01)
*H01Q 1/50* (2006.01)

(58) Field of Classification Search
CPC ...... H01Q 13/20; H01Q 13/203; H01Q 13/22; H01Q 19/15; H01Q 21/0012; H01Q 21/068; H04B 5/0018
See application file for complete search history.

(56) References Cited

U.S. PATENT DOCUMENTS

| | | | | |
|---|---|---|---|---|
| 2,611,867 | A * | 9/1952 | Alford | H01Q 13/12 333/33 |
| 3,795,915 | A * | 3/1974 | Yoshida | H01Q 13/203 333/237 |
| 4,186,400 | A * | 1/1980 | Cermignani | H01Q 1/287 342/372 |
| 5,757,331 | A | 5/1998 | Yoneyama et al. | |
| 2004/0066346 | A1* | 4/2004 | Huor | H01Q 21/005 343/770 |
| 2010/0321253 | A1* | 12/2010 | Ayala Vazquez | H01Q 1/2258 343/702 |
| 2012/0068893 | A1* | 3/2012 | Guterman | H01Q 1/2266 343/702 |
| 2012/0206302 | A1* | 8/2012 | Ramachandran | H01Q 1/24 343/702 |
| 2012/0309473 | A1* | 12/2012 | Choo | G06F 1/1656 455/575.7 |
| 2012/0313834 | A1* | 12/2012 | Eom | H01Q 1/243 343/787 |
| 2013/0222613 | A1 | 8/2013 | Yehezkely et al. | |
| 2013/0244739 | A1* | 9/2013 | Arkko | H04M 1/026 455/575.7 |
| 2013/0278468 | A1* | 10/2013 | Yehezkely | H01Q 1/24 343/702 |
| 2014/0184450 | A1* | 7/2014 | Koo | H01Q 5/335 343/702 |
| 2015/0102965 | A1* | 4/2015 | Irci | H01Q 1/24 343/702 |
| 2015/0116169 | A1* | 4/2015 | Ying | H01Q 21/28 343/729 |
| 2016/0308563 | A1* | 10/2016 | Ouyang | H04B 1/1081 |
| 2016/0351996 | A1* | 12/2016 | Ou | H01Q 1/241 |
| 2017/0110787 | A1* | 4/2017 | Ouyang | H01Q 1/243 |

FOREIGN PATENT DOCUMENTS

| | | | |
|---|---|---|---|
| EP | 0 615 305 | A1 | 9/2019 |
| JP | 2007-081825 | A | 3/2007 |
| JP | 2009-212828 | A | 9/2009 |
| KR | 10-2007-0093721 | A | 9/2007 |

OTHER PUBLICATIONS

Constantine A. Balanis "Modern Antenna Handbook, Chapter 7, Nov. 26, 2007".*

European Search Report dated Nov. 6, 2018, issued in the European Application No. 16885216.8-1205 / 3378125.

Chinese Office Action dated Oct. 9, 2019, issued in Chinese Application No. 201680078493.8.

* cited by examiner

WIRELESS COMMUNICATION DEVICE WITH LEAKY-WAVE PHASED ARRAY ANTENNA

CROSS-REFERENCE TO RELATED APPLICATION(S)

This application claims the benefit under 35 U.S.C. § 119(a) of a Russian patent application filed on Jan. 11, 2016, in the Russian Patent Office and assigned Serial number 2016100229, and of a Korean patent application filed on Jul. 6, 2016, in the Korean Intellectual Property Office and assigned Serial number 10-2016-0085454, the entire disclosure of each of which is hereby incorporated by reference.

TECHNICAL FIELD

The present disclosure relates to a method and apparatus for antenna devices. More particularly, the present disclosure relates to antenna devices capable of transmitting and receiving millimeter waves (mmWave) and wireless communication devices including the same.

BACKGROUND

The fifth generation (5G) technology of mobile networks or wireless systems has expanded performance and access to electronic devices and various user experiences by implementing easier linkage to nearby devices (e.g., wireless access) and enhanced energy efficiency. In wireless access techniques operated on millimeter wave (mmWave) frequencies, a majority of basic issues in antenna array physics and high-speed transceiver design and equalizer design have already been shown in WiGig/802.11ad standards. Wireless communication devices supportive of 4G/5G mobile networks or wireless local area mobile networks (e.g., wireless local area network (LAN)) may change position as the users change location, and thus may require a wide beamscanning scope to provide stable communication channels.

In equipping mmWave antennas in wireless communication devices, manufacturing costs, power efficiency, ease to make compact, or stable access may be taken into account. For example, as communication frequency bands increase, radio frequency integrated circuits (RFICs) may experience increased propagation loss or high-level noise factors. Forced boosting of the antenna gain may lead to stable access but may deteriorate the power efficiency. As another example, stable access may require a wide beamforming and beamscanning range. However, since the directivity increases as the communication frequency band rises up, the beamforming and beamscanning range may be reduced.

The above information is presented as background information only to assist with an understanding of the present disclosure. No determination has been made, and no assertion is made, as to whether any of the above might be applicable as prior art with regard to the present disclosure.

SUMMARY

Millimeter wave (mmWave) antennas running on a frequency band of several tens of GHz may be embodied in a module where a radio frequency integrated circuit (RFIC) and radiative conductor are integrated in a single circuit board. Such antenna module may not only run on a significantly high frequency band but may also provide excellent power efficiency, wide beamforming and beamscanning range to thereby allow for stable access to a communication network. Further, a mmWave antenna may be easily made smaller and may thus be equipped in a compact wireless communication device and/or an electronic device.

However, adoption of a metal structure (e.g., metal casing) to house the wireless communication device and/or the electronic device for a luxurious look deteriorates the operation environment for the antenna module. Further, as various dielectric structures as well as the metal structure are arranged around the antenna module, the performance associated with the antenna module may be undesirably reduced.

Aspects of the present disclosure are to address at least the above-mentioned problems and/or disadvantages and to provide at least the advantages described below. Accordingly, an aspect of the present disclosure is to provide an antenna device capable of providing stable communication network access through electrical harmony with the ambient metal structure or dielectric structures and a wireless communication device (or an electronic device) including the same.

In accordance with an aspect of the present disclosure, a wireless communication device is provided. The wireless communication device includes a housing having a conductive structure, an antenna device having a millimeter wave (mmWave) antenna including a plurality of antenna elements, the mmWave antenna being disposed within the housing, and a leaky-wave radiator.

The leaky-wave radiator may include at least one opening formed in the conductive structure of the housing.

An electromagnetic field generated by the mmWave antenna may be radiated outside of the housing of the wireless communication device through the leaky-wave radiator.

In accordance with another aspect of the present disclosure, a wireless communication device and/or an electronic device is provided. The wireless communication device and/or the electronic device includes a housing including a conductive structure having at least one opening, a circuit board having at least a portion disposed adjacent to the conductive structure in the housing, and a plurality of antenna elements disposed on the circuit board.

The plurality of antenna elements may correspond to the at least one opening in the conductive structure of the housing and an electromagnetic field generated by the plurality of antenna elements may be radiated outside of the housing through the at least one opening in the conductive structure of the housing.

In accordance with another aspect of the present disclosure, the plurality of antenna elements may be configured as a phased-array antenna to transmit and receive millimeter waves. In addition, the plurality of antenna elements may electrically couple with the conductive structure (e.g., a metal frame including at least one opening) provided in the wireless communication device and/or the electronic device. For example, the conductive structure may electrically couple with the plurality of antenna elements to be utilized as a leaky-wave phased-array antenna. The above wireless communication device and/or the electronic device may be operated in at least one beamforming mode among an array mode using an array of antenna elements, a leaky-wave mode using a leaky-wave radiator configured through the conductive structure, and a mixed mode implementing a combination of the array mode and the leaky-wave mode, thereby allowing for a wide beamforming and beamscanning range.

Other aspects, advantages, and features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
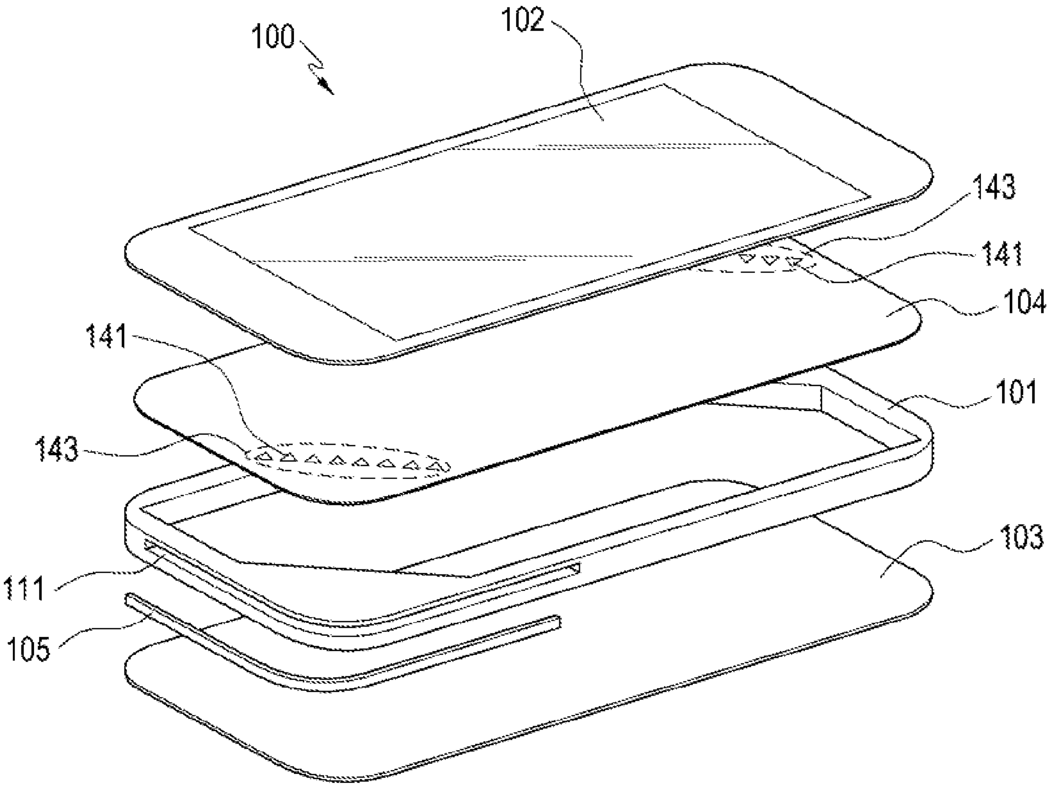
FIG. 1 is an exploded perspective view illustrating a wireless communication device and/or an electronic device according to an embodiment of the present disclosure.

The following description with reference to the accompanying drawings is provided to assist in a comprehensive understanding of various embodiments of the present disclosure as defined by the claims and their equivalents. The description includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

The terms coming with ordinal numbers such as ‘first’ and ‘second’ may be used to denote various components, but the components are not limited by the terms. The terms are used only to distinguish one component from another. For example, a first component may be denoted a second component, and vice versa without departing from the scope of the present disclosure. The term “and/or” may denote a combination(s) of a plurality of related items as listed or any of the items.

The terms “front,” “rear surface,” “upper surface,” and “lower surface” are relative ones that may be varied depending on directions in which the figures are viewed, and may be replaced with ordinal numbers such as “first” and “second.” The order denoted by the ordinal numbers, first and second, may be varied as necessary.

The terms as used herein are provided merely to describe some embodiments thereof, but not to limit the present disclosure. It is to be understood that the singular forms “a,” “an,” and “the” include plural references unless the context clearly dictates otherwise. It will be further understood that the terms “comprise” and/or “have,” when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term “electronic device” may be any device with a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a television (TV), a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the present disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, or a small area network (SAN).

According to an embodiment of the present disclosure, a wireless communication device and/or an electronic device may electromagnetically combine an antenna module including a plurality of antenna elements with a conductive structure (including at least one opening) of a case or housing. The above device may be operated in any one beamforming mode among an array mode by an array of antenna elements, a leaky-wave mode by a conductive structure, and a mixed mode according to a combination of the array mode and the leaky-wave mode, thereby allowing for a wide beamforming and beamscanning range.

The antenna module and/or antenna elements for configuring a mmWave antenna may be accommodated in the housing of the electronic device, and radio waves radiated from the antenna elements should be able to be transmitted through the metallic portion or dielectric portion of the housing. When the thickness (t) of the metallic portion or dielectric portion meets the following Equation 1, wireless signals may be transmitted through the metallic portion or dielectric portion of the housing.

$$t \leq \lambda_c/4/\sqrt{\varepsilon_r} \quad \text{Equation 1}$$

Here, $\lambda_c$ is the wavelength at the center frequency, e.g., 60.5 GHz. Upon adopting a typical dielectric constant $\varepsilon_r$, wireless signals may be smoothly transmitted when the metallic portion or dielectric portion of the housing is about 690 μm thick or less. However, for mechanical hardness of the electronic device, the thickness of the housing structure commonly exceeds the value, and wireless signals radiated from the antenna elements and/or antenna module may propagate along the surface of the electronic device, e.g., the surface of the metallic portion or dielectric portion of the housing. For example, the metallic portion or dielectric portion of the housing receiving the antenna elements and/or antenna module may deteriorate the antenna capability in transmitting and receiving wireless signals.

According to an embodiment of the present disclosure, the wireless communication device and/or the electronic device may implement a leaky-wave structure (e.g., a leaky-wave radiator or leaky-wave phased-array antenna) and combine the leaky-wave structure with the antenna elements by forming at least one opening in the conductive structure of the housing. The combination of the leaky-wave structure and antenna element array may diversify beamforming modes. For example, in the array mode where the antenna elements radiate wireless signals, mmWave transmission and reception may be carried out through phase power feeding to each antenna element, and in the mixed mode or leaky-wave mode, at least part of the electromagnetic energy radiated from the antenna elements may be focused onto the leaky-wave structure so that mmWave signals may be radiated by the leaky-wave structure to the free space.

According to an embodiment of the present disclosure, the antenna elements in the array mode may radiate wireless signals through the opening formed in the conductive structure of the housing. The leaky-wave phase array antenna may perform beamforming and beamscanning in a different direction and/or angle than in the array mode. For example, according to an embodiment of the present disclosure, the wireless communication device and/or the electronic device may secure a wider beamforming and beamscanning range by selectively operating the array mode and leaky-wave mode. In some embodiments, while the leaky-wave phased-array antenna operates, the antenna elements may radiate wireless signals through the opening, so that the wireless communication device and/or the electronic device according to an embodiment of the present disclosure may conduct beamforming in the mixed mode of the array mode and the leaky-wave mode. Accordingly, according to an embodiment of the present disclosure, the wireless communication device and/or the electronic device may secure a wide beamforming and beamscanning range even on a high communication frequency band of a few tens of GHz or more.

FIG. 1 is an exploded perspective view illustrating a wireless communication device and/or an electronic device 100 according to an embodiment of the present disclosure.

Figure 2:
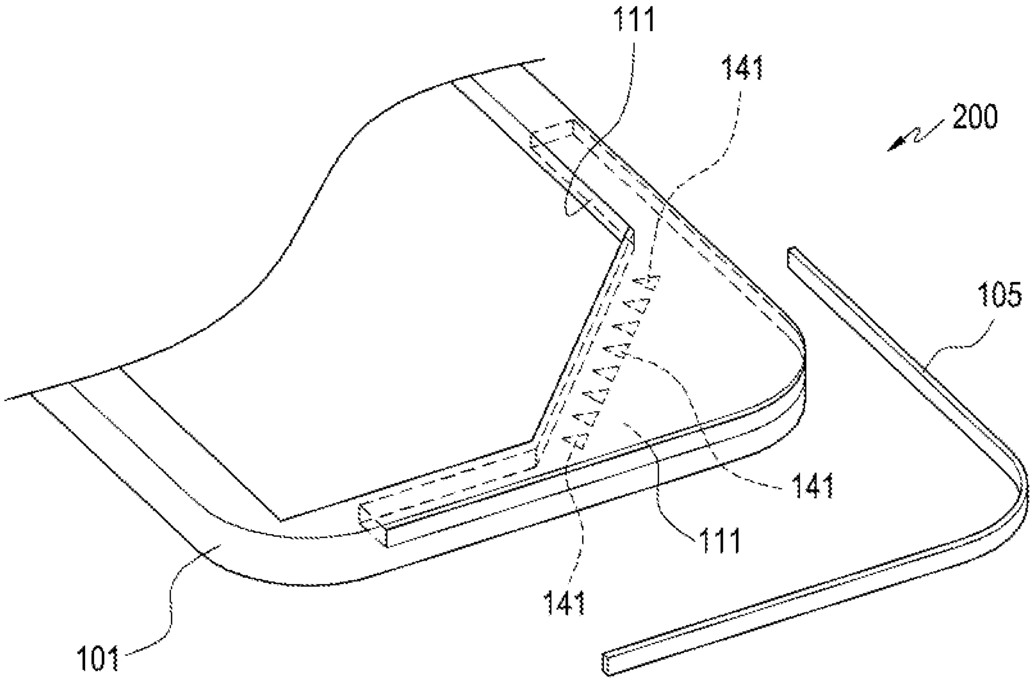
FIG. 2 is an exploded perspective view illustrating a portion of a wireless communication device and/or an electronic device including a leaky-wave structure according to an embodiment of the present disclosure.

FIG. 2 is an exploded perspective view illustrating a portion of a wireless communication device and/or an electronic device including a leaky-wave structure 200 according to an embodiment of the present disclosure.

Referring to FIGS. 1 and 2, according to various embodiments of the present disclosure, the wireless communication device and/or the electronic device 100 (hereinafter, "electronic device") may include a housing including a metal frame 101 and at least one of a front cover 102 and/or rear cover 103 and a circuit board 104 received in the housing. In an embodiment, the antenna module of the electronic device 100 may include a plurality of antenna elements 141. An array 143 of the antenna elements 141 may be formed on the circuit board 104. In addition, a plurality of arrays 143 of antenna elements 141 may be formed on the circuit board 104. In an embodiment, the antenna elements 141 within an array 143 each may receive phase difference power feeding independently from one another. For example, the array 143 of the antenna elements 141 may form a phased-array antenna. In another embodiment, the antenna elements 141, together with a radio frequency integrated circuit (RFIC), may be integrated on one circuit board (e.g., the circuit board 104).

According to an embodiment of the present disclosure, the metal frame 101 may generally have a closed loop shape and may include a conductive material at least partially. The rear cover 103 may be combined with the metal frame 101 to form a rear surface of the housing and/or the electronic device 100. The rear cover 103 may be formed of a metallic material, such as aluminum or magnesium or a dielectric, such as a synthetic resin. According to an embodiment of the present disclosure, the rear cover 103 and the metal frame 101 may be formed in a single body. For example, the rear cover 103 may be formed of the same material as the metal frame 101, or the rear cover 103, together with the metal frame 101, may be formed in a uni-body structure simultaneously with shape forming, without undergoing a separate assembling process. For example, the metal frame 101 and the rear cover 103 may be formed through an insert molding process. The front cover 102 may be combined with the metal frame 101 in a direction opposite the rear cover 103 to form a front surface of the housing and/or the electronic device 100. For example, the metal frame 101 may be provided to at least partially surround a space between the rear cover 103 and the front cover 102 and may form side wall(s) of the housing and/or the electronic device 100. The front cover 102 may be, e.g., a display having a window glass, a display device and/or a touch panel integrated together.

The housing may include at least one opening 111 formed to pass through a side wall, e.g., the metal frame 101. The opening(s) 111 may be formed on, e.g., the conductive structure of the metal frame 101. According to an embodiment of the present disclosure, the opening(s) 111 may be elongated slot(s) formed in one or more of the side walls of the housing. For example, the opening(s) 111 may be formed in one side wall, or multiple side walls of the housing. In an exemplary embodiment, the opening(s) 111 may be formed in two discrete side walls of the housing or two adjacent side walls of the housing. In addition, one opening 111 may span two side walls of the housing. According to an embodiment of the present disclosure, a portion of the circuit board 104 and/or the antenna element(s) 141 may be disposed in the opening 111. At least a portion of the opening(s) 111 may be electromagnetically combined with the antenna element(s) 141 to form a leaky-wave structure 200 (e.g., a leaky-wave phased-array antenna).

According to an embodiment of the present disclosure, a plurality of circular or polygonal openings 111 may be arranged on a side wall (e.g., the conductive structure part of the metal frame 101) of the housing. One or more of the plurality of openings 111 formed in the side wall of the housing may be used as acoustic holes of the electronic device 100. For example, the openings 111 may be used as microphone holes for receiving a sound wave associated with a user's voice or sound output holes for outputting sound generated from a speaker module disposed within the housing. According to an embodiment of the present disclosure, such acoustic holes, although not directly receiving the antenna element(s) 141, may be arranged adjacent to the antenna element(s) 141 or array 143 of the antenna elements 141. For example, the plurality of openings 111 provided as acoustic holes, each, may be electromagnetically coupled with the antenna element(s) 141 to form a leaky-wave structure 200 (e.g., a leaky-wave phased-array antenna).

According to an embodiment of the present disclosure, the circuit board 104 may be formed of one of a printed circuit board (PCB) or low temperature co-fired ceramic (LTCC) board. The antenna element(s) 141, when a patch(s) disposed on at least one surface of the circuit board 104 or the circuit board 104 is a multi-layered circuit board, may include a grid structure including a combination of a via hole and/or a conductive pattern formed in the multi-layered circuit board or the patch formed on at least one layer of the circuit board 104. According to an embodiment of the present disclosure, the antenna element(s) 141 may be a zeroth order mode resonator. When the circuit board 104 is received in the housing, the antenna element(s) 141 may be received in the opening 111 or disposed adjacent to the opening 111.

According to an embodiment of the present disclosure, a beam deflector 105 may be disposed in the housing, e.g., within the opening 111. The beam deflector 105 may be inserted from outside of the housing to the opening 111. According to an embodiment of the present disclosure, the beam deflector 105 may include a body formed generally of a dielectric (e.g., synthetic resin) and a parasitic conductor formed in the body. When the beam deflector 105 is inserted into the opening 111, a side surface thereof may be exposed to the free space (e.g., an external space of the housing). According to an embodiment of the present disclosure, the beam deflector 105 may be combined with the opening 111 to form a leaky-wave structure 200 (e.g., a leaky-wave phased-array antenna). For example, upon transmission or reception of wireless signals through the antenna element(s) 141, the beam deflector 105 may be combined with the opening 111 to transform a flow of surface current generated in the conductive structure (e.g., the metal frame 101) into a leaky-wave and radiate the leaky-wave to the free space.

Figure 3:
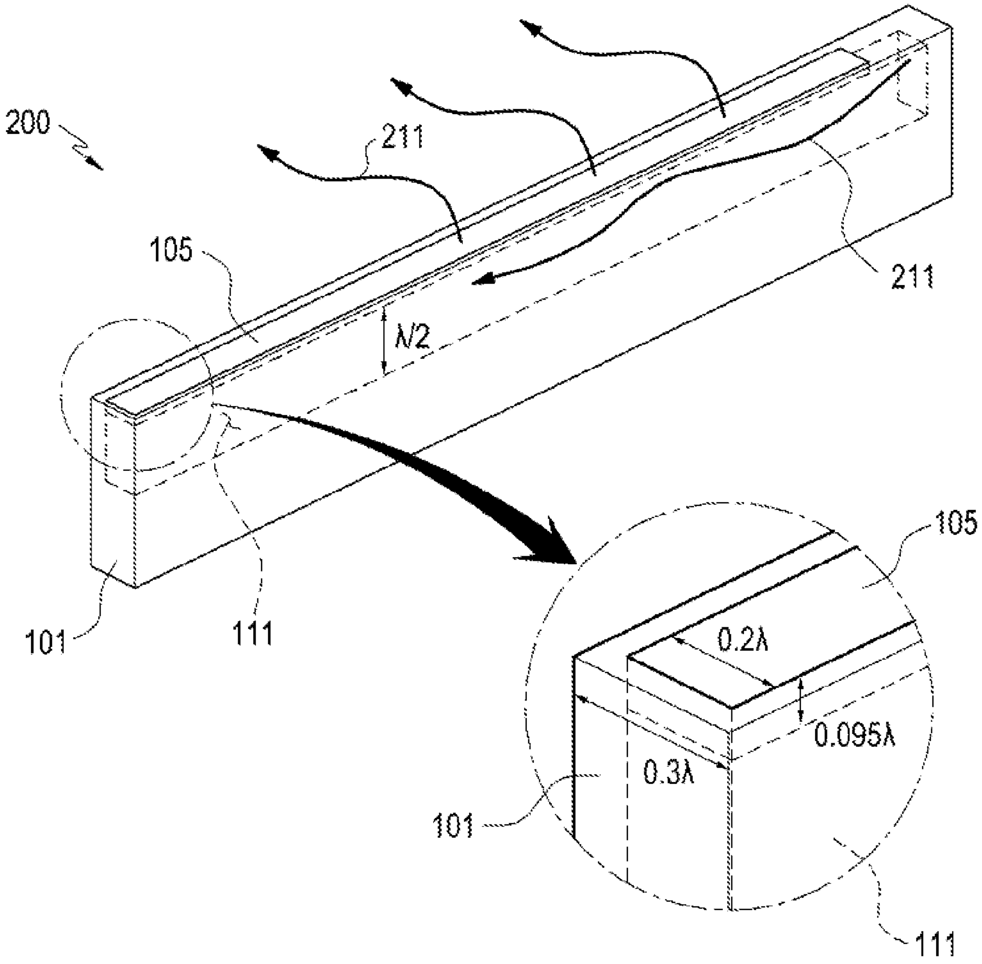
FIG. 3 is a view illustrating a leaky-wave structure of a wireless communication device and/or an electronic device according to an embodiment of the present disclosure.

FIG. 3 is a view illustrating a leaky-wave structure 200 of a wireless communication device (e.g., the electronic device 100 of FIG. 1) and/or an electronic device according to another embodiment of the present disclosure.

In the embodiments described above in connection with FIGS. 1 and 2 an example is described in which an opening 111 is formed over two side surfaces of the housing. In the instant embodiment, however, a leaky-wave structure 200 is described in which an opening 111 is formed in a single side surface of the housing (e.g., the metal frame 101), for example.

Referring to FIG. 3, the leaky-wave structure 200 may include an opening 111 formed in one straight line section on a side surface, e.g., the metal frame 101, of the housing and a beam deflector 105 mounted in the opening 111. In the outside face of the metal frame 101, the opening 111 may have a size of 0.2λ×0.5λ (where 'λ' is the wavelength of a resonant frequency formed in the leaky-wave structure 200). The beam deflector 105 may be inserted from outside of the metal frame 101 into the opening 111 to close the opening 111. For example, the beam deflector 105 may be disposed within the opening 111 such that an outer surface of the beam deflector 105 is substantially flush with the sidewalls of the metal frame 101 surrounding the opening 111. The beam deflector 105 may have a thickness of, e.g., 0.095λ, and the opening 111 may have a depth of 0.5λ from the inside face of the beam deflector 105.

In the above leaky-wave structure 200, an electromagnetic wave, as denoted with reference numeral 211, may propagate along the length direction of the opening 111 or may be radiated to the free space through the beam deflector 105. The radiation direction (or angle) of the electromagnetic wave and/or a wireless signal radiated to the free space may be varied depending on the phase distribution of power provided to the above-described array of antenna elements 141 or the propagation constant of the leaky-wave structure 200.

Figure 4:
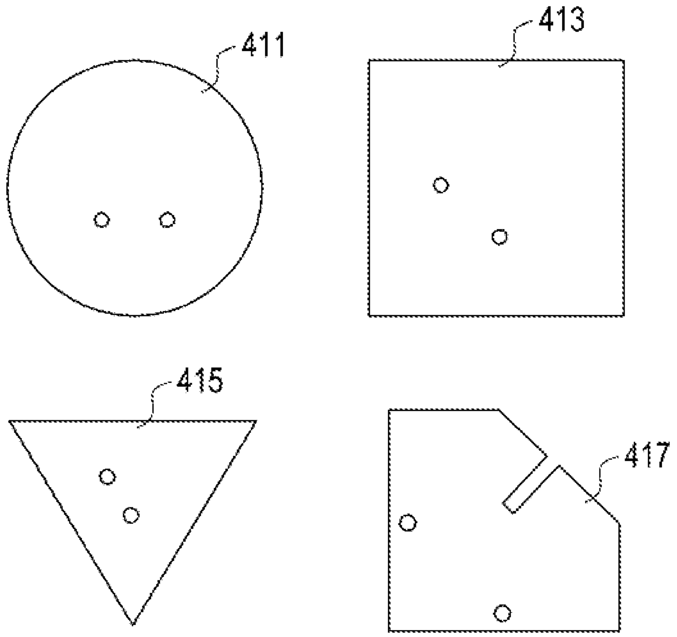
FIG. 4 is a plan view illustrating various forms of antenna elements of a wireless communication device and/or an electronic device according to an embodiment of the present disclosure.

FIG. 4 is a plan view illustrating various forms of antenna elements 411, 413, 415, and 417 of a wireless communication device and/or an electronic device according to an embodiment of the present disclosure. Although in the following description antenna elements are denoted only with reference numeral '411,' antenna elements indicated with reference numerals '413,' '415,' and '417' may be included rather than meaning only antenna elements indicated with '411' of FIG. 4.

Referring to FIG. 4, the antenna element(s) 411 may be in a form of a patch formed on at least one surface or layer of the circuit board 104 as described above. Generally, the antenna element(s) 411, 413, 415, and 417 may be shaped as a circular patch (e.g., antenna element 411) or a rectangular patch (e.g., antenna element 413), or the antenna elements may have other various shapes, such as diamond-shaped patch (e.g., antenna element 415) or polygonal patch (e.g., antenna element 417) depending on the arrangement region or radiation direction allowed on the circuit board 104.

Figure 5:
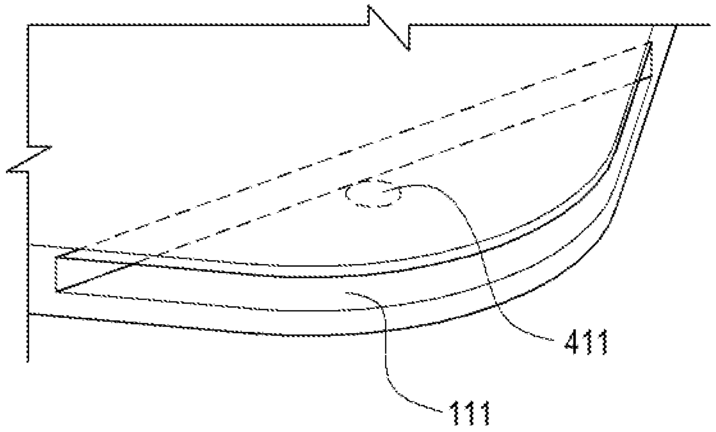
FIG. 5 is a view illustrating an example in which antenna elements of a wireless communication device and/or an electronic device are arranged according to an embodiment of the present disclosure.

FIG. 5 is a view illustrating an example in which antenna elements 411 of a wireless communication device and/or an electronic device are arranged according to an embodiment of the present disclosure.

Figure 6:
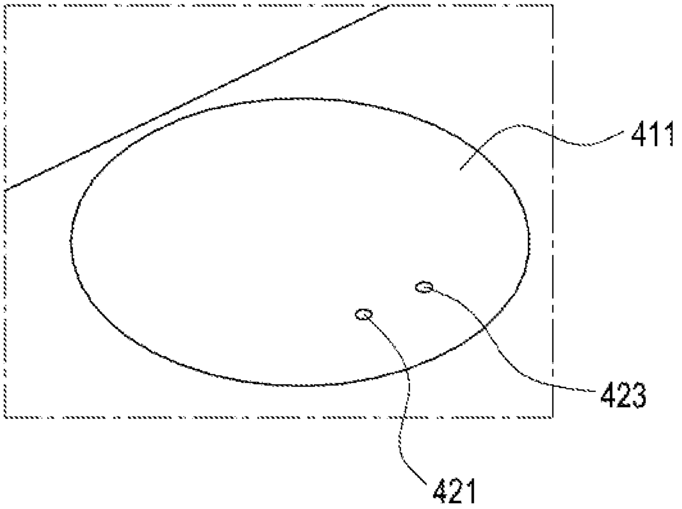
FIG. 6 is a view illustrating a power feeding structure for an antenna element(s) of a wireless communication device and/or an electronic device according to an embodiment of the present disclosure.

FIG. 6 is a view illustrating a power feeding structure for an antenna element(s) 411 of a wireless communication device and/or an electronic device according to an embodiment of the present disclosure.

Referring to FIGS. 5 and 6, the antenna element 411 may have, e.g., a circular patch shape and may receive power feeding through a pair of power feeding ports 421 and 423. The power feeding ports 421 and 423 may be provided in various locations depending on the radiation direction of wireless signals or installation environment of the array 143 of antenna elements (e.g., the antenna elements 141 of FIG. 1) including the antenna element 411. For example, the antenna array 143 including the antenna element 411 may be disposed adjacent to a corner in the electronic device (e.g., the electronic device 100 of FIG. 1) and/or housing and may be disposed inside the opening 111 formed in the metal frame (e.g., the metal frame 101 of FIG. 1). Power feeding signals respectively provided to the power feeding ports 421 and 423 may have a phase difference with respect to each other which allows the radiation direction of wireless signals transmitted and received through the antenna element 411 to be set in various manners. In FIGS. 5 and 6, although only one antenna element 411 is disposed in the opening 111, this is merely an example, and the present disclosure is not limited thereto. For example, the antenna element 411 may form one of antenna elements (e.g., the antenna element 141) constituting the array (e.g., the array 143 of antenna elements 141) shown in FIG. 1 and/or FIG. 2.

Figure 7:
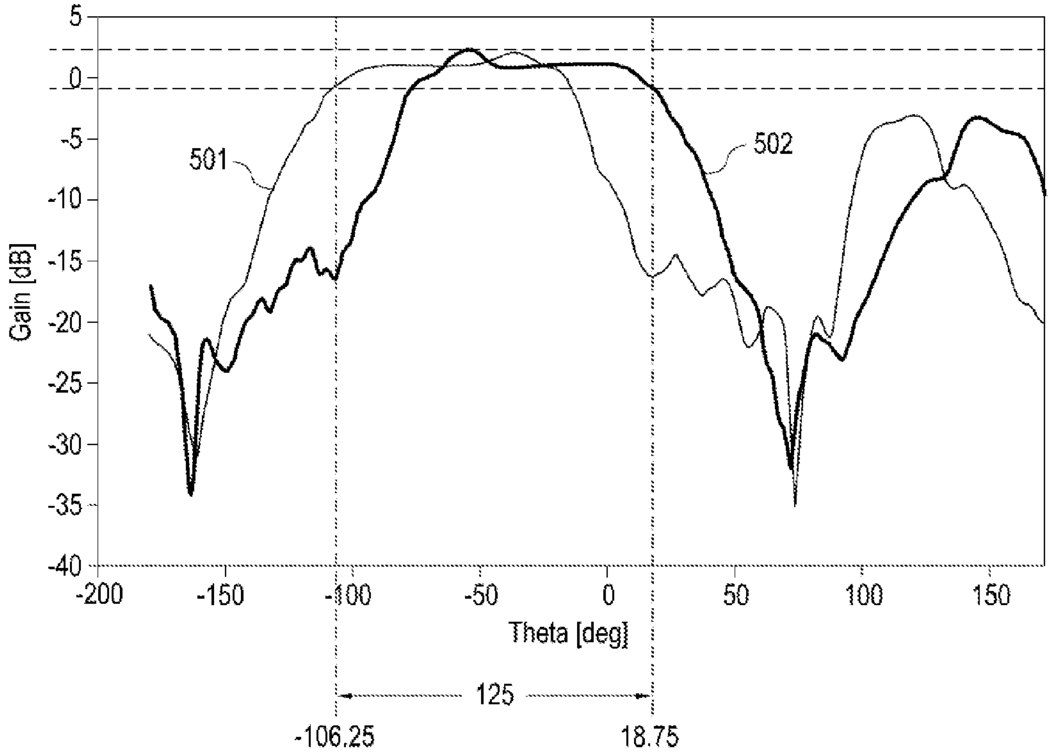
FIG. 7 is a graph illustrating a radiation pattern by phase difference power feeding for antenna elements of a wireless communication device and/or an electronic device according to an embodiment of the present disclosure.

FIG. 7 is a graph illustrating a radiation pattern by phase difference power feeding for antenna elements of a wireless communication device and/or an electronic device according to an embodiment of the present disclosure.

Referring to FIG. 7, the radiation pattern denoted with reference numeral '501' is obtained by measuring a radiation pattern formed when feeding a +90-degree phase difference signal to the second power feeding port (e.g., the power feeding port 423 of FIG. 6) with respect to a power feeding signal provided to the first power feeding port (e.g., the power feeding port 421 of FIG. 6) in providing power feeding to the antenna element (e.g., the antenna element 411 of FIG. 6). The radiation pattern denoted with reference numeral '502' is obtained by measuring a radiation pattern formed when feeding a −90-degree phase difference signal to the second power feeding port 423 with respect to the power feeding signal provided to a reference feeding port, e.g., the first power feeding port 421.

Under the above-described signal feeding condition, a beamscanning range of about 125 degrees (about +−62 degrees) from −106.25 degrees to +18.75 degrees could be secured while forming a gain variation range less than 3 dB from the maximum gain. When only the +90-degree phase difference signal is fed to the same antenna element (e.g., the antenna element 411 of FIG. 6), a beamscanning range from −76.67 degrees to +18.04 degrees, i.e., about 95 degrees, may be secured, and when only the −90-degree phase difference signal is fed, a beam scanning range of about 94 degrees, from −107.08 degrees to −13.00 degrees, may be secured. For example, it can be shown that the beamscanning range may be expanded by about 30 degrees by providing a phase difference power feeding signal to the antenna element 411. In some embodiments, the beamscanning range may be further widened by providing independent phase difference power feeding signals to the antenna elements (e.g., each antenna element 141 of FIG. 1), respectively, of an array of the antenna elements (e.g., the antenna array 143 of FIG. 1).

Figure 8:
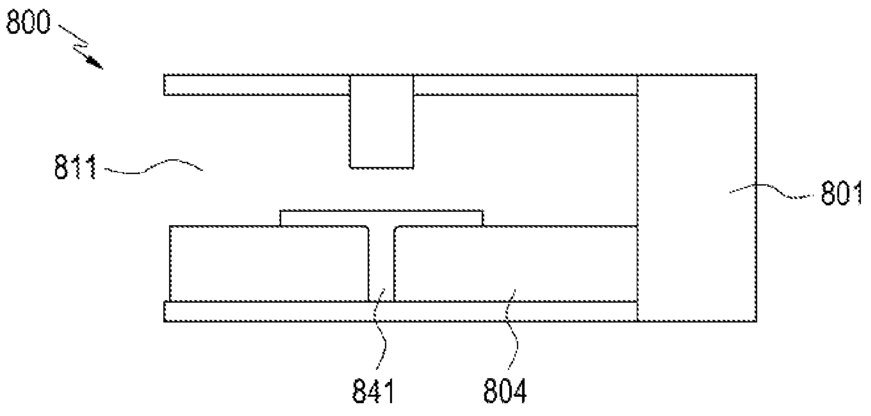
FIG. 8 is a view illustrating an example of an antenna element(s) of a wireless communication device and/or an electronic device according to an embodiment of the present disclosure.

FIG. 8 is a view illustrating an example of an antenna element(s) 841 of a wireless communication device and/or an electronic device according to an embodiment of the present disclosure.

As set forth above, according to an embodiment of the present disclosure, the antenna module of an electronic device (e.g., the electronic device 100 of FIG. 1) may have a patch formed on one surface and/or one layer of the circuit board, or a grid structure formed in the multi-layered circuit board, or antenna element(s) of a zeroth mode resonator structure. FIG. 8 illustrates an example of the antenna module 800 including an antenna element 841 using a zeroth mode resonator structure. A metal frame 801 (and/or housing) including a conductive structure may be disposed around the antenna element 841, and the metal frame 801 may provide a ground base for the antenna element 841. The power feeding to the antenna element 841 may be provided through a printed circuit pattern formed in the circuit board 804. For example, the antenna module 800 may be formed through a combination of the antenna element 841 of a zeroth mode resonator structure, the metal frame 801 around the antenna element 841, and a cavity 811 in the metal frame 801 and/or the circuit board 804. The antenna element 841 of the zeroth mode resonator structure may be easy to slim down, thereby reducing the area that an array of antenna elements 841 (e.g., the array 143 of the antenna elements 141 of FIG. 1) occupies on the circuit board 804. For example, the use of the zeroth mode resonator structure may lead to more efficient arrangement and utilization of the inner space of the electronic device.

Figure 9:
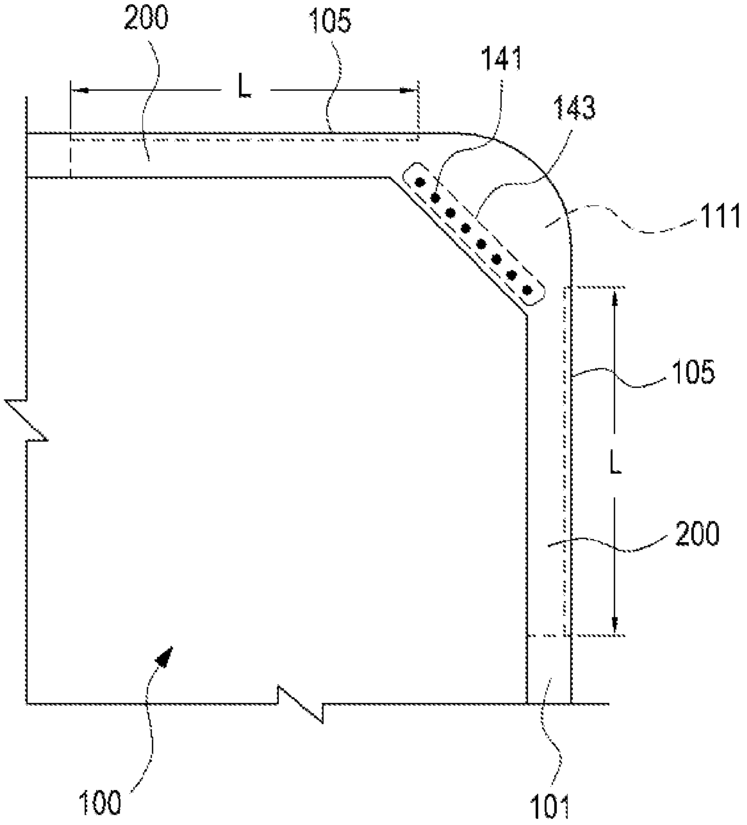
FIG. 9 is a view illustrating an antenna device of a wireless communication device and/or an electronic device according to an embodiment of the present disclosure.

FIG. 9 is a view illustrating an antenna device of a wireless communication device and/or an electronic device according to an embodiment of the present disclosure.

In describing the following embodiments, the configuration or structure easy to understand from the description of the above embodiment may be denoted with the same reference numerals as in the foregoing embodiments and a detailed description thereof may be omitted.

Referring to FIG. 9, the metal frame 101 of the electronic device 100 may have an opening 111 formed over two side surfaces thereof, and the array 143 of antenna elements 141 at the corner of the metal frame 101 may directly radiate wireless signals to the free space through a portion of the opening 111 (e.g., the above-described array mode). In an embodiment, beam deflectors 105, respectively, may be mounted on two adjacent surfaces of the metal frame 101 within, at least, other portions of the opening 111, thereby leading to formation of leaky-wave structures 200 respectively at both sides of the array 143 of the antenna elements 141. In other words, when a single opening 111 is formed such that the opening 111 spans two adjacent surfaces of the metal frame 101, a first beam deflector 105 is disposed in a first portion of the opening 111, and a second beam deflector 105 is disposed in a second portion of the opening 111. The leaky-wave structure(s) 200 may form an electromagnetic coupling with at least one of the antenna elements 141 constituting the array 143, thereby functioning as a leaky-wave phased-array antenna. The length (L) of the leaky-wave structure(s) 200 may be determined based on at least one of the frequency (or wavelength) of wireless signals transmitted or received, the structure or material property (e.g., permittivity) of the metal frame 101 or beam deflector 105, radiation direction/angle in design, or a combination thereof.

Figure 10:
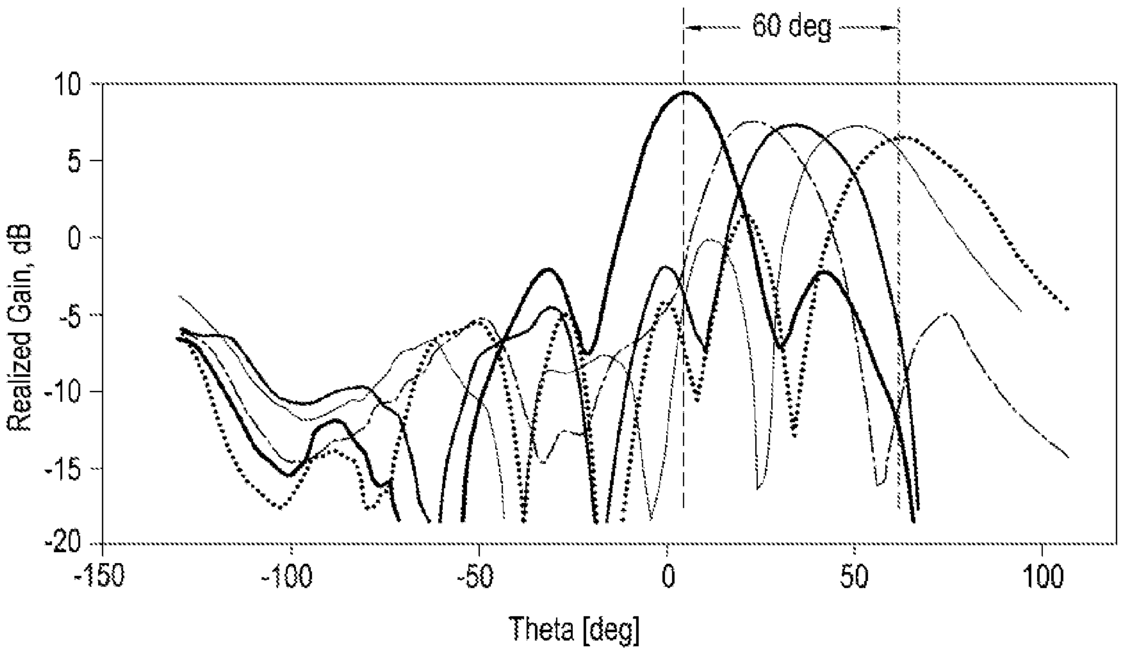
FIGS. 10 to 12 are graphs illustrating radiation patterns as per radiation modes of an antenna device of a wireless communication device and/or an electronic device according to various embodiments of the present disclosure.
Figure 11:
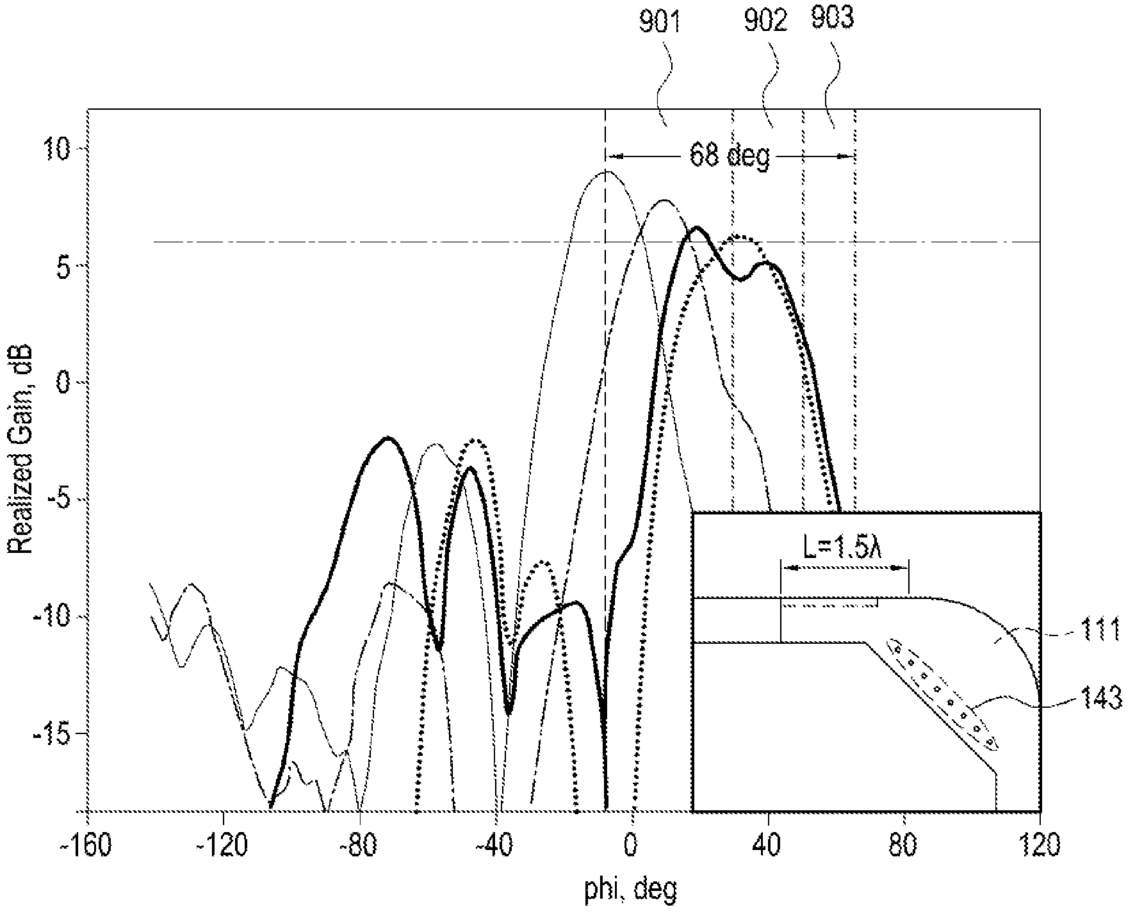
Figure 12:
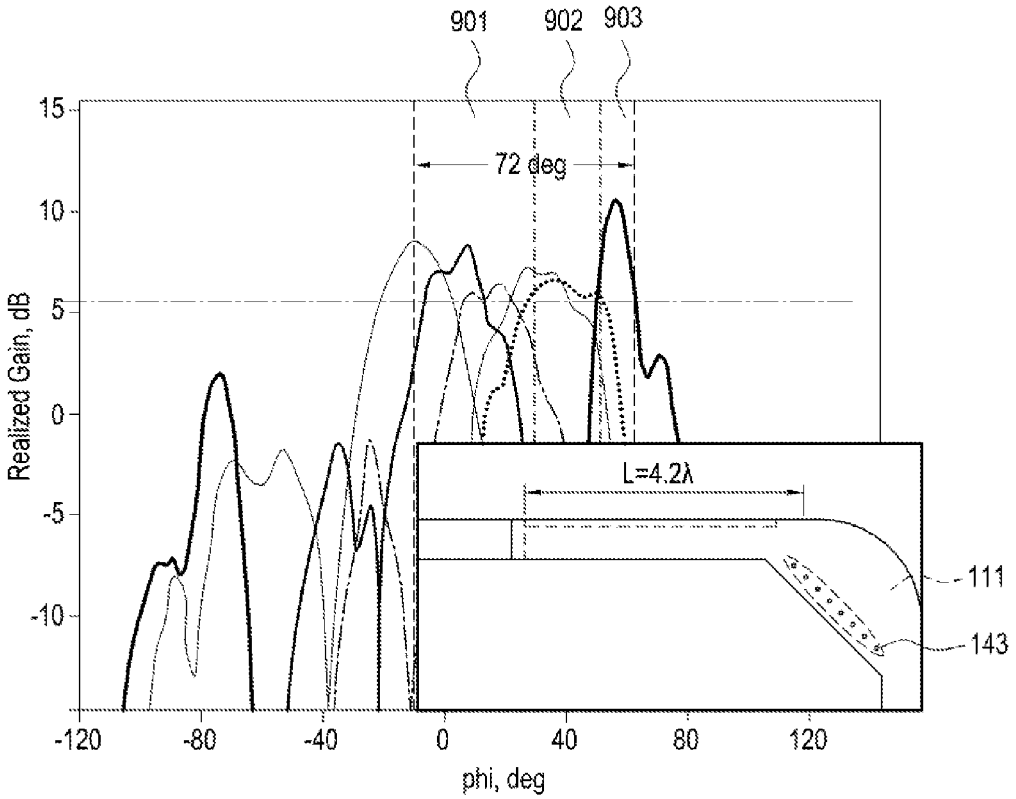

FIGS. 10 to 12 are graphs illustrating radiation patterns as per radiation modes of an antenna device of a wireless communication device and/or an electronic device according to various embodiments of the present disclosure.

Figure 13:
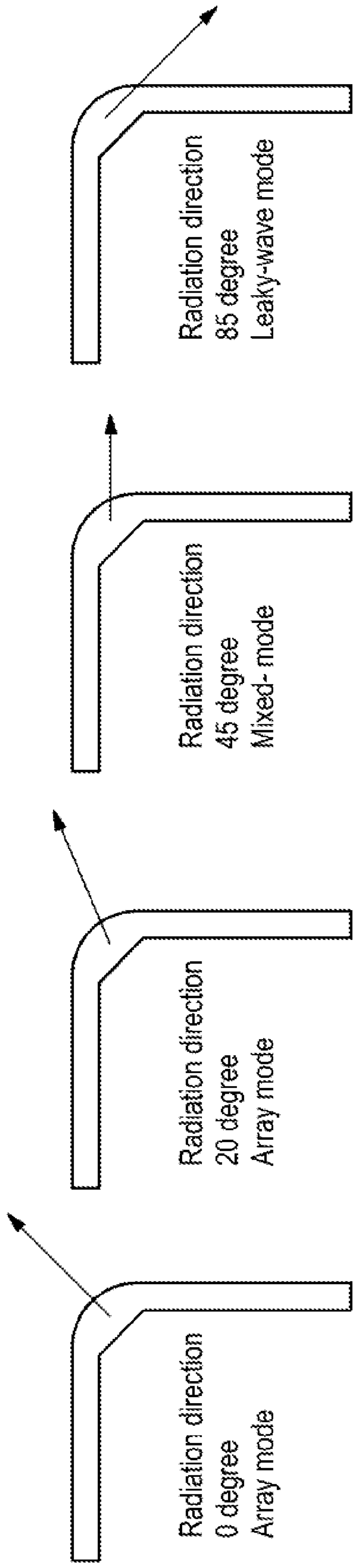
FIG. 13 is a view illustrating radiation characteristics as per a radiation mode of an antenna device in a wireless communication device and/or an electronic device according to an embodiment of the present disclosure.

FIG. 13 is a view illustrating radiation characteristics as per a radiation mode of an antenna device in a wireless communication device and/or an electronic device according to an embodiment of the present disclosure.

The radiation characteristics of the antenna device are described with reference to FIGS. 10 to 13, along with FIG. 9.

Referring to FIG. 10, FIG. 10 illustrates a graph including radiation patterns obtainable by radiation of the antenna element array 143. For example, when the electronic device operates in an array mode (and/or when the length of the leaky-wave structure is substantially 0), e.g., when eight antenna elements 141 produce radiation in the array 143, a beamscanning range of about +−60 degrees may be secured, and in the corresponding range, a variation in the antenna gain may be varied in a range from 6.4 dBi to 9.4 dBi.

Referring to FIG. 11, FIG. 11 illustrates a graph including radiation patterns obtainable when the length (L) of the leaky-wave structure (e.g., the length (L) of the leaky-wave structure 200 of FIG. 9) is set to 1.5λ (where, λ is the wavelength of a resonant frequency formed in the leaky-wave structure), and the electronic device operates in any one beamscanning mode of an array mode, a mixed mode, and a leaky-wave mode. For example, when the electronic device operates in the array mode 901, the beamscanning range may be expanded by +−30 degrees, and when operating in the mixed mode 902, the beamscanning range may be expanded by +−60 degrees. When the electronic device operates in the leaky-wave mode 903, the beamscanning range may be expanded by +−68 degrees. At this time, the antenna gain may be varied in a range from 6 dBi to 9 dBi.

Referring to FIG. 12, FIG. 12 illustrates a graph including radiation patterns obtainable when the length (L) of the leaky-wave structure 200 is set to 4.2λ, and the electronic device operates in any one beamscanning mode of an array mode, a mixed mode, and a leaky-wave mode. For example, when the electronic device operates in the array mode 901, the beamscanning range may be expanded by +−30 degrees, and when operating in the mixed mode 902, the beamscanning range may be expanded by +−60 degrees. When the electronic device operates in the leaky-wave mode 903, the beamscanning range may be expanded by +−72 degrees. At this time, the antenna gain may be varied in a range from 6 dBi to 10 dBi.

As described above, the antenna gain and/or the beamscanning range measured while varying the length (L) of the leaky-wave structure 200 are shown in the following Table 1.

TABLE 1

| | Antenna gain (dBi) | | |
|---|---|---|---|
| Length of leaky-wave structure (λ) | Center beam | Maximum beamscanning Gain at angle | Beamscanning range Degrees (deg) |
| 0 | 9.4 | 6 | +−60 |
| 1.5 | 9 | 6.6 | +−68 |
| 2.3 | 9 | 8.1 | +−68 |
| 3.3 | 9 | 8.9 | +−70 |
| 4.3 | 8.8 | 10.0 | +−72 |
| 4.5 | 9 | 9.3 | +−72 |

As such, according to an embodiment of the present disclosure, the electronic device may operate in each of the array mode, the mixed mode, and the leaky-wave mode by selecting a combination of the antenna elements 141 included in the array 143 of the leaky-wave structure 200 such that the electronic device may expand the beamscanning range to +−72 angles accordingly.

Generally, mmWave antennas (e.g., a phased-array antenna including the above-described antenna element array 143) arranged in an electronic device may have a beamscanning range limited by various nearby structures (e.g., housing, conductive structure, etc.). Further, as a width of the electronic device is reduced, the beamscanning range of the antennas arranged in the electronic device may be further limited. In contrast, as described above, according to an embodiment of the present disclosure, the electronic device 100 including an antenna device may expand the beamscanning range by radiating surface current that may be generated as the antenna elements 141 operate to the free space. For example, according to an embodiment of the present disclosure, the electronic device may secure a beam-scanning range in a proper manner through the mixed mode and/or the leaky-wave mode substantially without deteriorating the antenna gain.

Figure 14:
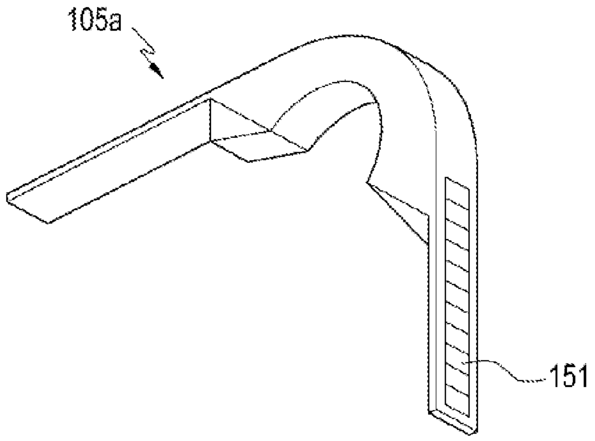
FIGS. 14 and 15 are perspective views illustrating beam deflectors of an antenna device in a wireless communication device and/or an electronic device according to various embodiments of the present disclosure.
Figure 15:
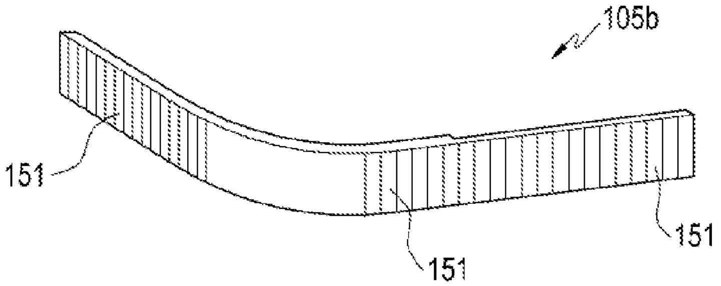

FIGS. 14 and 15 are perspective views illustrating beam deflectors 105*a* and 105*b* of an antenna device in a wireless communication device and/or an electronic device according to various embodiments of the present disclosure.

Referring to FIGS. 14 and 15, according to various embodiments of the present disclosure, the beam deflectors 105*a* and 105*b* have a shape corresponding to the shape of an outer surface of the housing (e.g., the metal frame 101 of FIG. 1) or opening 111 formed over two adjacent side surfaces of the housing. The beam deflectors 105*a* and 105*b* may include a parasitic conductor 151. A parasitic conductor 151 may be a conductive pattern, formed inside or on an outer surface of beam deflectors 105*a* and 105*b*. In some embodiments, if the opening 111 is formed on one side surface of the housing, the beam deflectors 105*a* and 105*b* may have a flat plate shape. The parasitic conductor 151 may radiate electromagnetic energy focused onto the above-described leaky-wave structure or opening to the free space in the mixed mode or leaky-wave mode.

FIGS. 16 to 19 are views illustrating various forms of leaky-wave structures in an antenna device of a wireless communication device and/or an electronic device according to various embodiments of the present disclosure.

Figure 16:
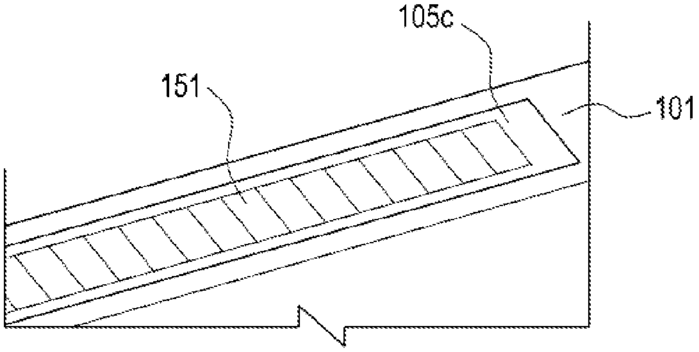
FIGS. 16 to 19 are views illustrating various forms of leaky-wave structures in an antenna device of a wireless communication device and/or an electronic device according to various embodiments of the present disclosure.

Referring to FIG. 16, according to an embodiment of the present disclosure, the beam deflector 105*c* of the electronic device may be exposed through an outer surface of the metal frame 101 and may include a conductive pattern, such as a parasitic conductor 151, formed on the outer surface or inner surface of the beam deflector 105*c* or received (buried) therein.

Figure 17:
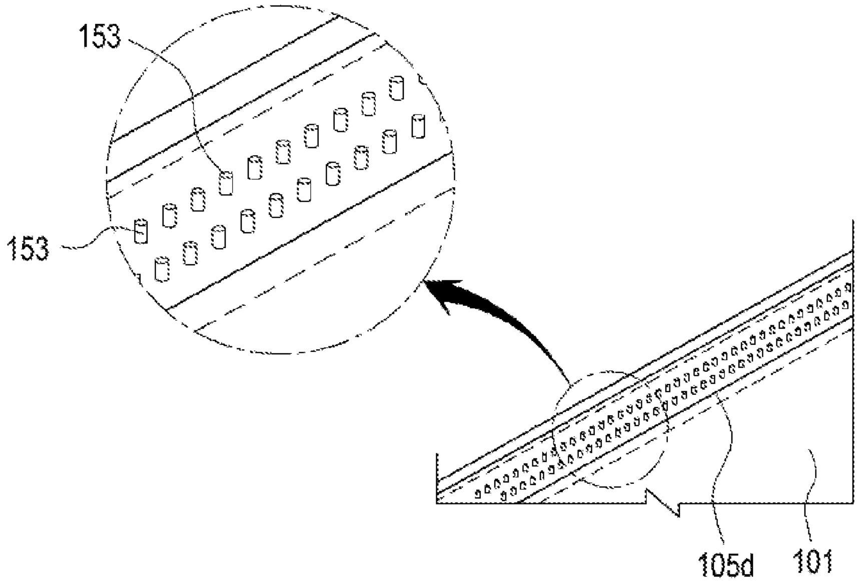

Referring to FIG. 17, according to an embodiment of the present disclosure, the beam deflector 105*d* of the electronic device may by exposed through an outer surface of the metal frame 101 and may include at least one parasitic conductor 153, e.g., a conductive element, received (buried) therein, thereby forming a partial reflection surface(s).

Figure 18:
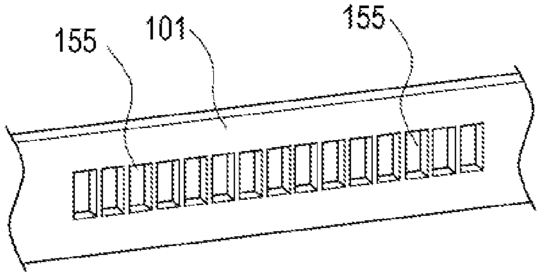
Figure 19:
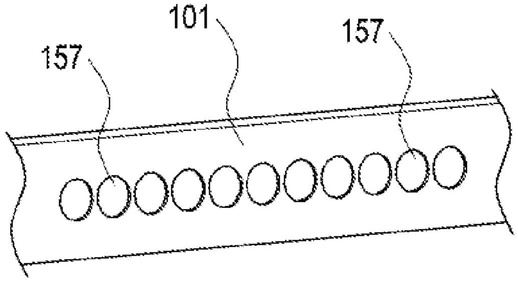

Referring to FIGS. 18 and 19, according to various embodiments of the present disclosure, a beam deflector of the electronic device may include a conductive structure, e.g., the metal frame 101, and a plurality of openings 155 and 157 formed in the metal frame 101. The openings 155 and 157 may be arranged in an array and a portion of the metal frame 101 may be electromagnetically combined with an antenna element array (e.g., the array 143 of FIG. 1) through the cavity formed inside the metal frame 101. The openings 155 and 157 may transform a surface current into a leaky-wave and radiate the leaky-wave to the free space. In some embodiments, the openings 155 and 157 may have a polygonal or circular shape and may be partially filled with a dielectric. According to an embodiment of the present disclosure, when the electronic device has a sound input or output function, at least some of the openings 155 and 157 may be utilized as an acoustic hole through which sound is propagated.

Figure 20:
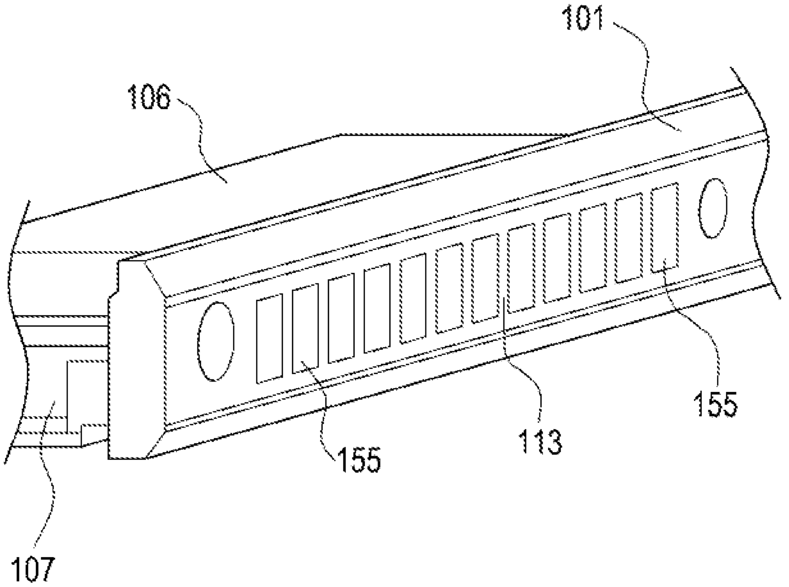
FIGS. 20 to 22 are views illustrating a structure of an antenna device in a wireless communication device and/or an electronic device according to various embodiments of the present disclosure.
Figure 21:
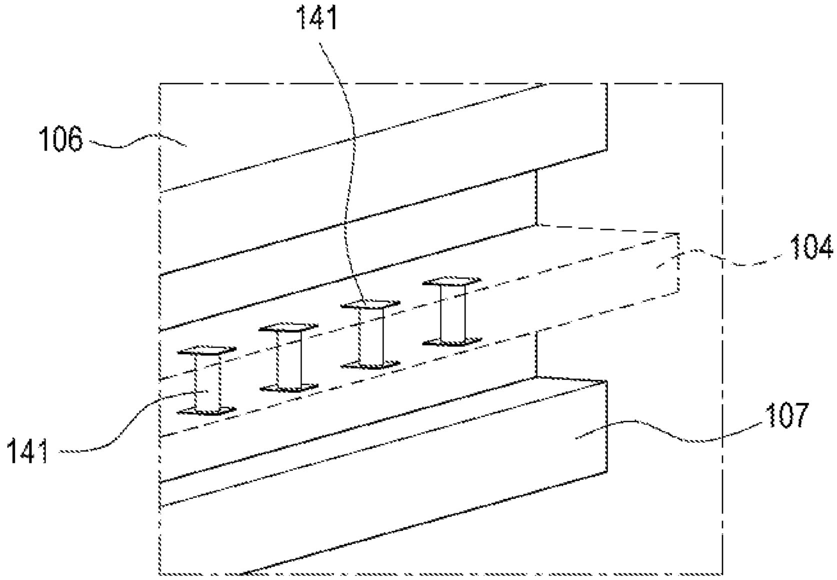
Figure 22:
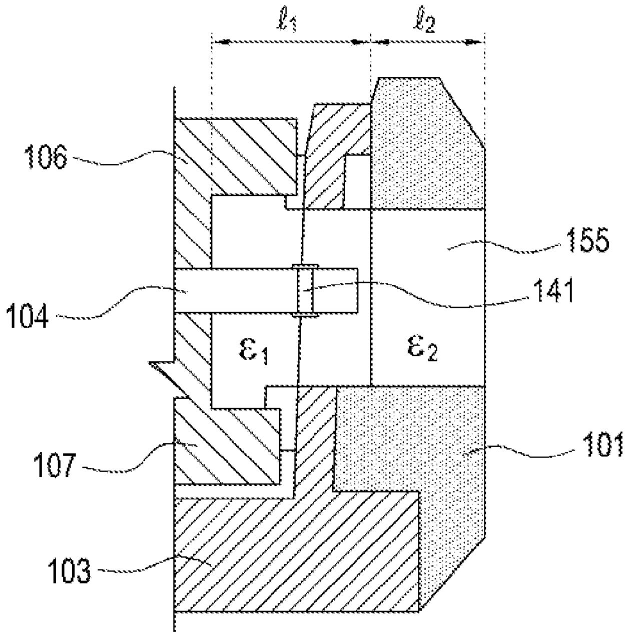

FIGS. 20 to 22 are views illustrating a structure of an antenna device in a wireless communication device and/or an electronic device according to various embodiments of the present disclosure.

Referring to FIGS. 20 to 22, a portion of the metal frame 101 in the electronic device may be provided as a leaky-wave surface 113 (e.g., a partial reflection surface). For example, the metal frame 101 may have a plurality of openings 155 (e.g., a waveguide) filled with a dielectric, and the conductive structure (or conductive pattern) between the neighboring openings 155 may function as the leaky-wave surface 113. A circuit board 104 including antenna element(s) 141 may be received inside the metal frame 101. The antenna elements 141 may be arranged adjacent to the openings 155 inside the metal frame 101. In some embodiments, the electronic device may include a first planar conductor 106 and a second planar conductor 107 positioned adjacent to the conductive structure, e.g., the metal frame 101. The first planar conductor 106 and the second planar conductor 107 may be disposed adjacent to each other, with at least a portion of the circuit board 104, e.g., the portion of the circuit board 104 associated with the antenna elements 141 (and/or an array area of the antenna elements 141) interposed therebetween. In addition, the rear cover 103 may be disposed below the second planar conductor 107 and adjacent to the metal frame 101.

According to an embodiment of the present disclosure, the first planar conductor 106 and/or the second planar conductor 107 may be disposed in the metal frame 101 to enhance the hardness of the above-described electronic device. In another embodiment, the first planar conductor 106 and/or the second planar conductor 107 may provide an electromagnetic shielding function between the circuit board 104 and other electronic parts (e.g., the display device, etc.). In another embodiment, the first planar conductor 106 and/or the second planar conductor 107 may spatially and/or electromagnetically isolate various electronic parts (e.g., the processor, RFIC, audio module, power management module, etc.) arranged in the circuit board 104 from each other.

In an embodiment, the space surrounded by the metal frame 101, the first planar conductor 106, and the second planar conductor 107, along with the openings 155 (e.g., the openings filled with a dielectric) may form a leaky-wave structure (e.g., a waveguide). For example, a surface current generated from the metal frame 101 and/or electromagnetic energy focused onto the space may be transformed into a leaky-wave through the leaky-wave surface 113, and the leaky-wave may be radiated to the free space. For example, the leaky-wave surface 113 may be utilized as an impedance matching circuit between the free space and the antenna element(s) 141. In some embodiments, the space and the conductive structures forming the same may be electromagnetically combined with the antenna element(s) 141 and/or an array of the antenna elements 141 to form a plurality of waveguide structures. For example, the plurality of antenna elements 141 may receive power from an RFIC through channels independent from each other where the plurality of antenna elements 141, along with conductive structures surrounding the plurality of antenna elements 141, may form a waveguide structure(s).

Figure 23:
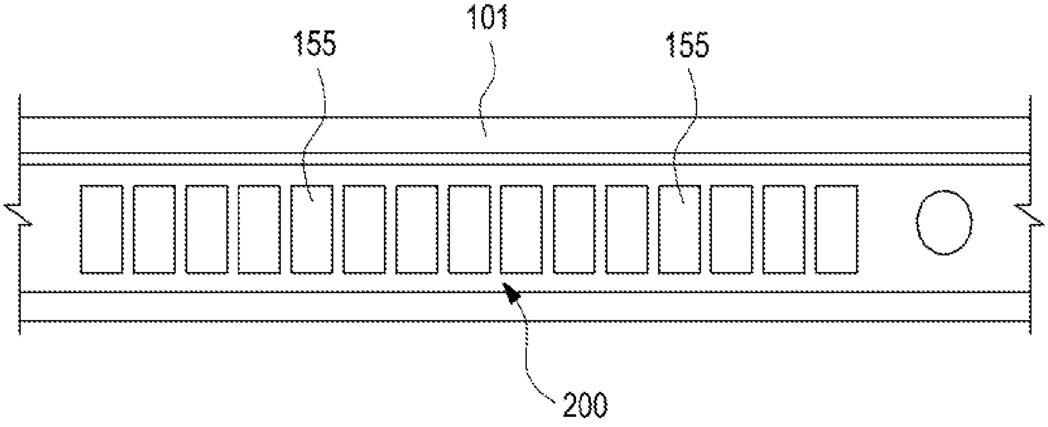
FIGS. 23 to 25 are views illustrating a leaky-wave structure of an antenna device of a wireless communication device and/or an electronic device according to various embodiments of the present disclosure.
Figure 24:
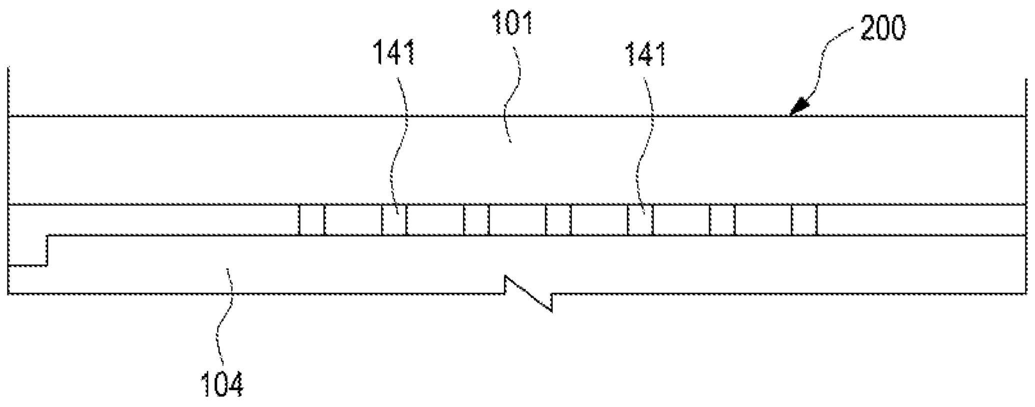
Figure 25:
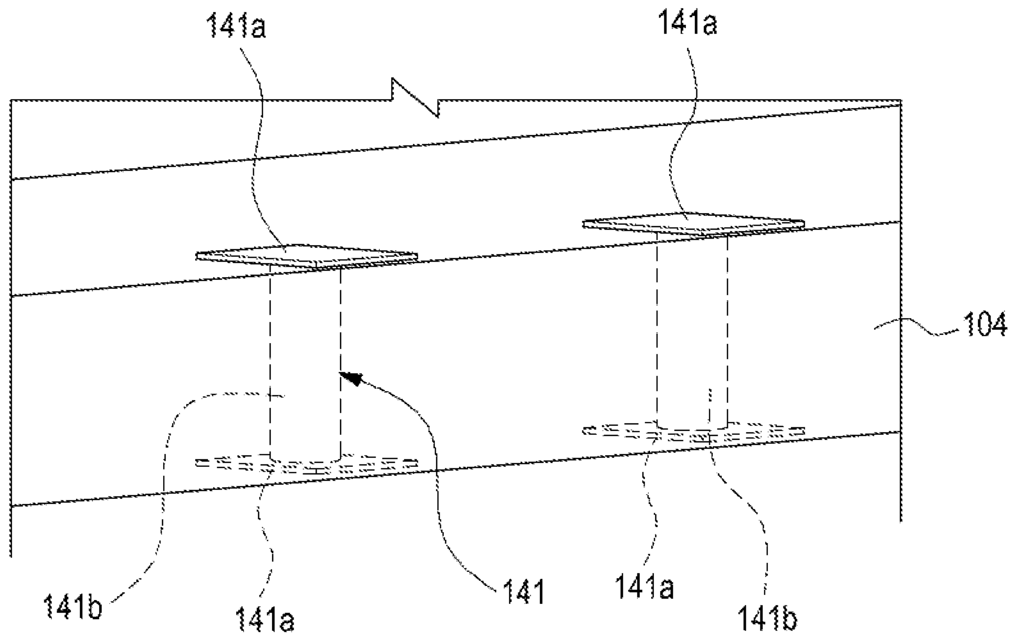

FIGS. 23 to 25 are views illustrating a leaky-wave structure 200 of an antenna device of a wireless communication device and/or an electronic device according to various embodiments of the present disclosure.

Referring to FIGS. 23 to 25, a plurality of openings 155 may be arranged in the metal frame 101, and a cavity accommodating antenna element(s) 141 (e.g., the cavity between the openings 155 and the antenna element(s) 141) may be combined with the openings 155 to form a leaky-wave structure 200. The plurality of antenna elements 141 may be arranged (e.g., on the circuit board 104) at predetermined intervals (periodically) which are larger than λc/4 (where, λc is the wavelength at the center frequency) and smaller than λc. The antenna gain or the beamscanning range may be easily controlled by arranging the antenna elements 141 at predetermined intervals. As the arrangement period of the antenna elements 141 increases, the gain rises up, but the beamscanning range may be reduced.

In some embodiments, as shown in FIG. 25, the antenna element(s) 141 may include patches 141*a* respectively arranged on both surfaces of the circuit board 104 and a via conductor 141*b* buried in the circuit board 104 to connect the patches 141*a* together. However, the present disclosure is not limited to the shape or structure of the antenna element(s), and the antenna element(s) 141 may rather be implemented in various structures, e.g., a zeroth mode resonator or grid structure including patches or a combination of patches and via hole of a different shape.

In another embodiment, the cavity and/or openings 155 in the leaky-wave structure 200 may directly be fed power through a probe power feeding structure. For example, exemplified in the above-described embodiment is a configuration in which at least a portion of electromagnetic energy radiated from the antenna elements 141 is radiated to the free space through the leaky-wave structure 200. However, the leaky-wave structure 200 may be fed power through a route independent from the antenna elements 141 to operate as a leaky-wave radiator (leaky-wave phased-array antenna).

Figure 26:
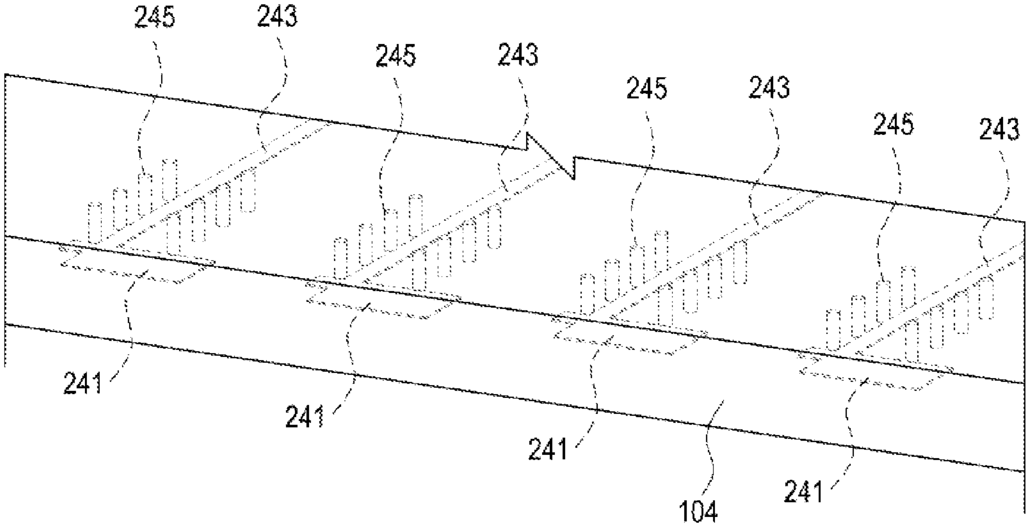
FIGS. 26 and 27 are views illustrating another example of a leaky-wave structure of an antenna device in a wireless communication device and/or an electronic device according to various embodiments of the present disclosure.
Figure 27:
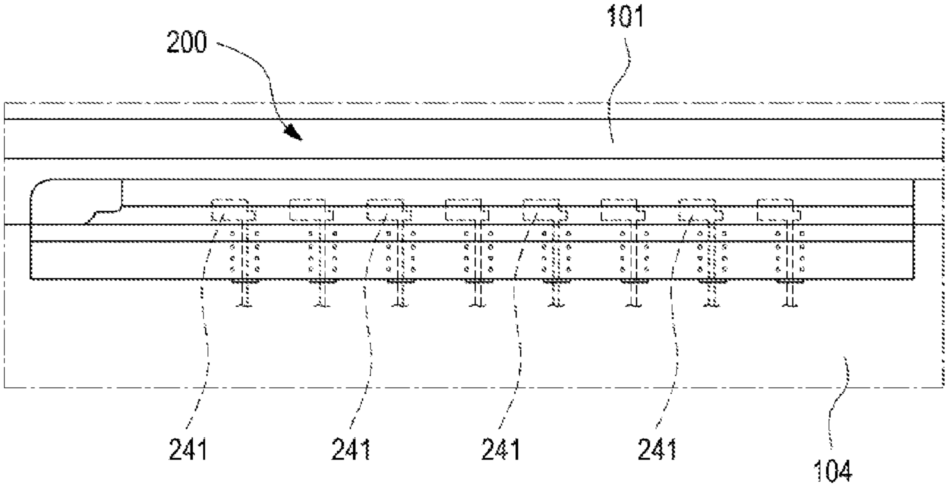

FIGS. 26 and 27 are views illustrating another example of a leaky-wave structure 200 of an antenna device in a wireless communication device and/or an electronic device according to various embodiments of the present disclosure.

Referring to FIGS. 26 and 27, according to various embodiments of the present disclosure, the electronic device may include an antenna module 241 having an array of eight antenna elements 245 disposed on the circuit board 104 inside the metal frame 101. A strip line 243 may connect the antenna elements 245 of each antenna module 241 where each antenna module 241 may form a horizontal deflecting antenna array and may be positioned inside the above-described beam deflector and/or leaky-wave structure 200.

FIGS. 28 to 31 are views illustrating implementation examples of an antenna element of an antenna device in a wireless communication device and/or an electronic device according to various embodiments of the present disclosure.

In the antenna device and/or the electronic device in the embodiment disclosed through FIGS. 20 to 27, the array of antenna elements 141 and 245 may be formed on the circuit board 104 received inside the metal frame 101 while positioned adjacent the leaky-wave structure 200 including a portion of the metal frame 101.

Figure 28:
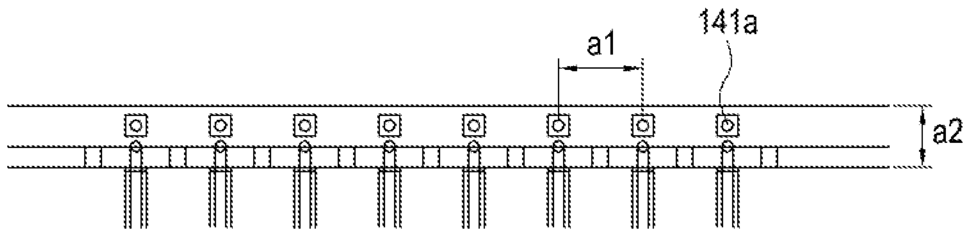
FIGS. 28 to 31 are views illustrating implementation examples of an antenna element of an antenna device in a wireless communication device and/or an electronic device according to various embodiments of the present disclosure.
Figure 29:
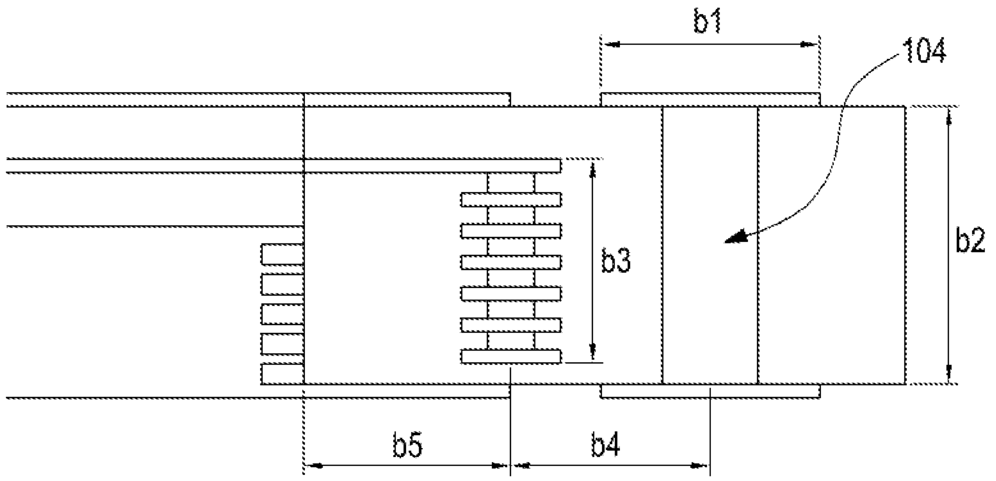

In the embodiment regarding vertical deflecting beamforming ($E_\theta$) in a φ=0 plane, e.g., the embodiment disclosed through FIGS. 20 to 25 and/or FIGS. 28 and/or 29, a wave coupler may be implemented in the form of a parallel plate waveguide including a reflecting wall or director coupler. In the embodiment, the antenna elements 141 or 245 may be connected with the RFIC through a strip line 243 to receive power. In some embodiments, a portion (and/or layer) of the circuit board 104 denoted with 'a2' in FIG. 28 and/or FIG. 30 is substantially a dielectric layer and may function as a dielectric transformer matching the antenna elements 141 and 245 with the leaky-wave structure 200 and/or free space at an edge of the circuit board 104.

Figure 30:
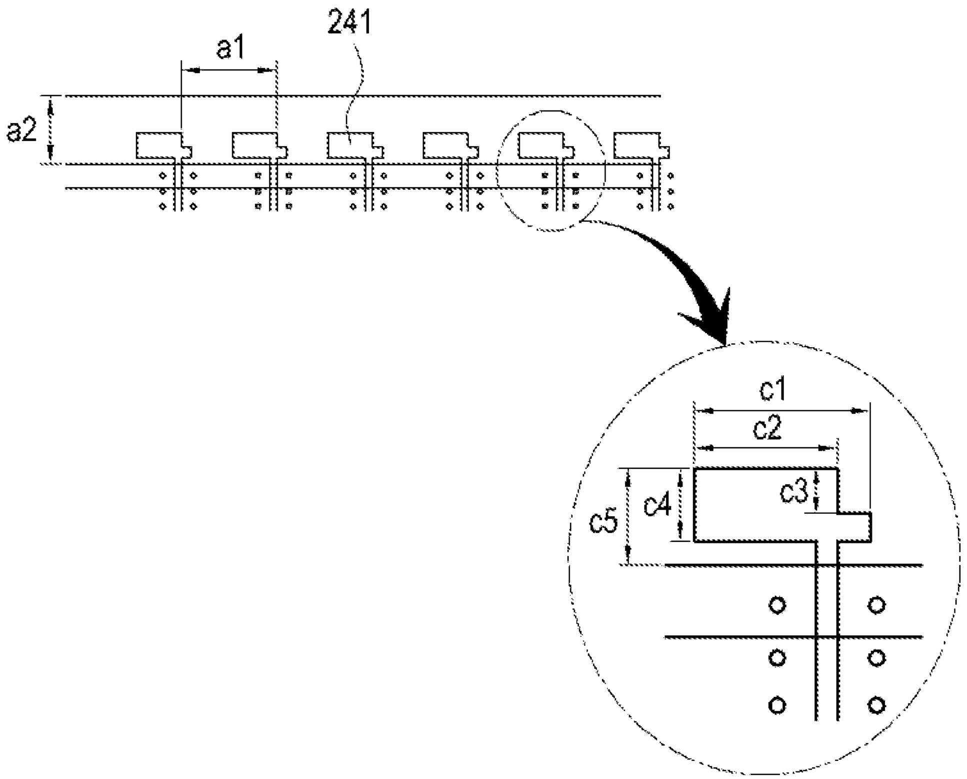
Figure 31:
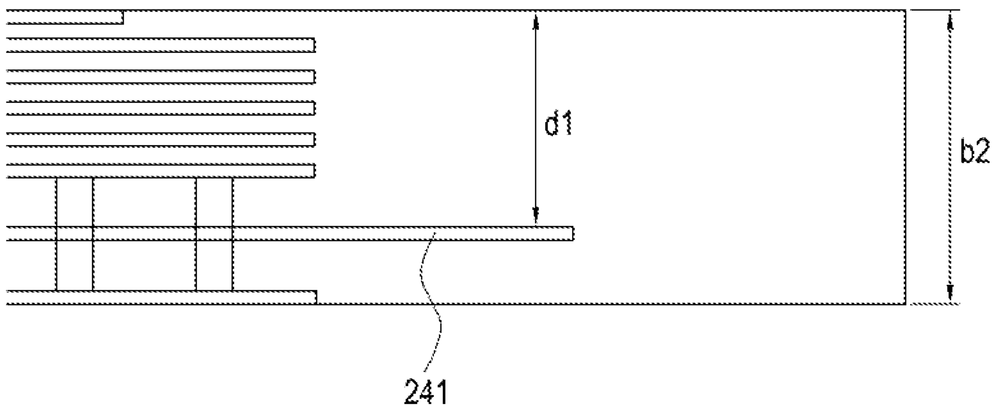

In the embodiment regarding horizontal deflecting beamforming ($E_\theta$) in a φ=0 plane, e.g., the embodiment disclosed through FIGS. 26 and 27 and/or FIGS. 30 and 31, the horizontal deflecting couplers may be implemented as monopole elements having a reflection wall.

Various dimensions regarding the antenna elements 141 or 245 associated with the arrangements as shown in FIGS. 28 to 31 are disclosed through the following Table 2.

TABLE 2

| Parameter | Dimension (mm) | Parameter | Dimension (mm) | Parameter | Dimension (mm) |
|---|---|---|---|---|---|
| a1 | 2.20 | b1 | 0.56 | c1 | 1.25 |
| a2 | 1.56 | b2 | 0.72 | c2 | 1.05 |
| d1 | 0.58 | b3 | 0.51 | c3 | 0.30 |
| | | b4 | 0.52 | c4 | 0.50 |
| | | b5 | 0.53 | c5 | 0.66 |

Various embodiments may apply to the dimensions of the antenna and/or the antenna elements depending on mechanical or structural design in the electronic device. For example, the dimensions specified in Table 2 above may properly be varied depending on the arrangement of electronic parts or structures in the electronic device or the size of the electronic device.

For example, in the above-described structure of the electronic device, the circuit board 104 may be mechanically combined or assembled with the planar conductor. In some embodiments, the circuit board 104 where the antenna elements 141 or 245 are arranged may be spaced apart from the metal frame 101 to be avoided from mechanical stress. In another embodiment, as the leaky-wave is smoothly tapered, the surface wave may be transformed into a radiated space wave and the matching condition between the dielectric slab and the free space may be enhanced.

In order to maintain a stable communication link even under an irregular variation in the user environment (e.g., a variation in the propagation environment due to the user's movement and/or change in location), the array 143 of antenna elements 141 or 245 may have a deflection control means or may have the functionality of creating vertical/horizontal polarization. Accordingly, the electronic device may remain in a stable communication connection under various operation environment conditions.

Figure 32:
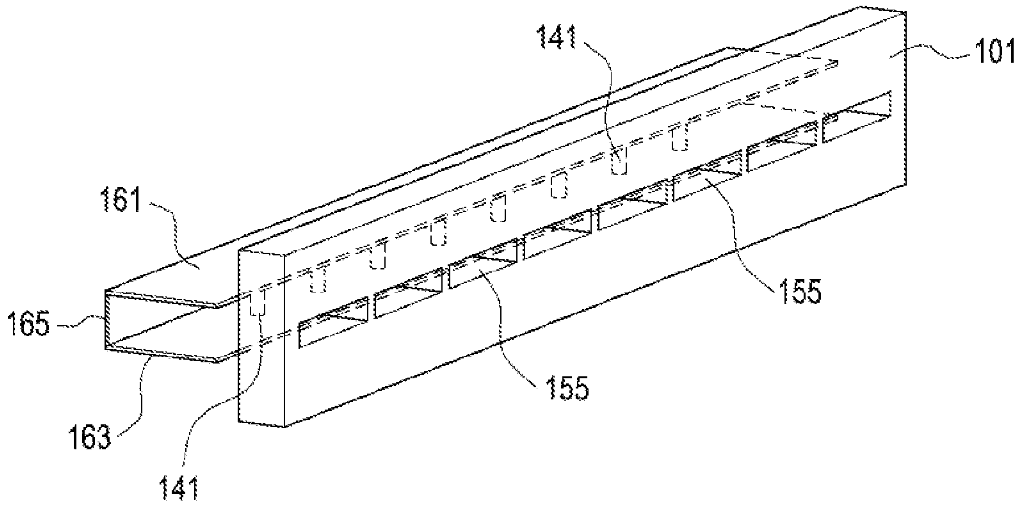
FIGS. 32 and 33 are views illustrating another example of a leaky-wave structure of an antenna device in a wireless communication device and/or an electronic device according to various embodiments of the present disclosure.
Figure 33:
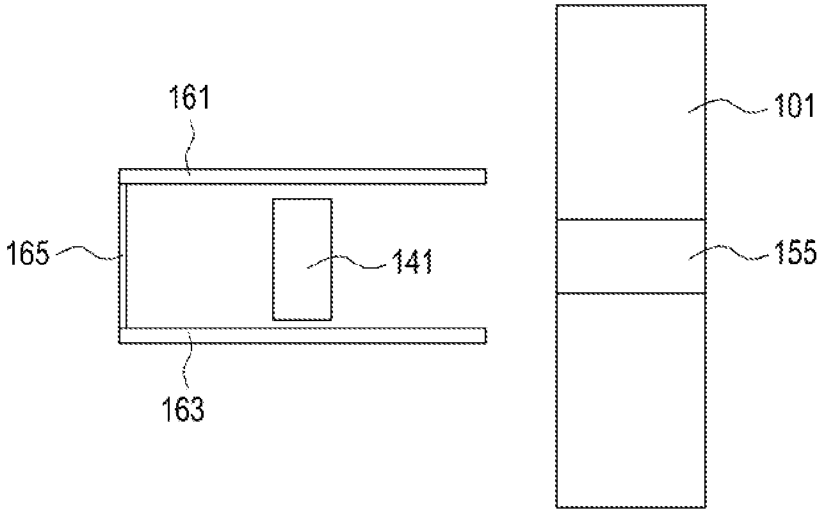

FIGS. 32 and 33 are views illustrating another example of a leaky-wave structure of an antenna device in a wireless communication device and/or an electronic device according to various embodiments of the present disclosure.

Referring to FIGS. 32 and 33, the planar conductors (e.g., the first planar conductor 106 and the second planar conductor 107 of FIGS. 21 and 22) in the above-described embodiment may be replaced with conductive layers formed on the circuit board 104, along with the antenna element(s) 141. For example, a first planar conductor 161 and a second planar conductor 163 may be formed on two different layers, respectively, of a circuit board 104, and the antenna element(s) 141 may be arranged between the first planar conductor 161 and the second planar conductor 163. In some embodiments, the electronic device and/or the antenna device may further include a third planar conductor 165 connecting the first planar conductor 161 with the second planar conductor 163. The third planar conductor 165, together with the first planar conductor 161 and the second planar conductor 163, may be disposed to at least partially surround the antenna element(s) 141 to thereby form a waveguide structure.

Figure 43:
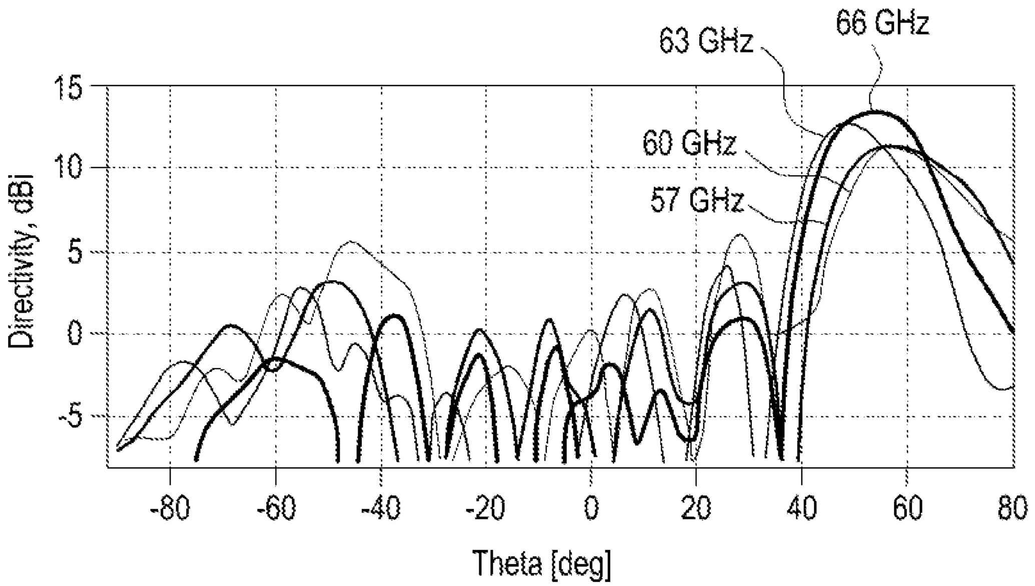

Referring to FIG. 43, the quasi-TEM mode transmitted has a low frequency dispersion of phase constant β, and when operated on a frequency band of 57 GHz to 66 GHz, the quasi-TEM mode may minimize the beam squinting effect of leaky-wave antenna.

Referring back to FIG. 22, use of the leaky-wave structure partially filled with air may minimize the effective permittivity of $\varepsilon_{eff}$. The effective permittivity $\varepsilon_{eff}$ may be computed through the following Equation 2.

$$\varepsilon_{eff}=(l_1+l_2)\varepsilon_1\varepsilon_2/(\varepsilon_1 l_2+\varepsilon_2 l_1) \qquad \text{Equation 2}$$

Here, $l_1$ is the length of the section filled with air in the leaky-wave structure, and $l_2$ is the length of the section filled with a dielectric in the leaky-wave structure.

In some embodiments, quasi-uniform dielectric structures may be formed by a partial reflection surface (e.g., the leaky wave surface 113 of FIG. 20) having a period of 1.6 mm The array of openings (e.g., the openings 155 of FIG. 22) forming a partial reflection surface with such a small period may substantially operate as a leaky-wave antenna. The opening(s) 155 for forming a partial reflection surface may be optimized only for reflection from a basic high-speed waveform mode and might not be combined with other spatial harmonics. In this case, the antenna may radiate a single beam without parasitic nulls in the beamscanning range.

The leaky-wave radiation may expand the beamscanning range of the antenna element array (e.g., the array 143 of FIG. 1) up to $\theta_0$=70 degrees from the normal direction. The propagation constant $\beta_0^W$ by the radiation angle of leaky-wave may be defined by the following Equation 3.

$$\beta_0^W=k_0 \sin\theta_0 \qquad \text{Equation 3}$$

Here, $k_0$ which means the free space wavenumber may be defined as follows: $k_0=2\pi/\lambda_0$. In the antenna device and/or the electronic device according to an embodiment of the present disclosure, a ratio $$\left(\left|\frac{\beta_0^W}{k_0}\right|\right)$$

of $\beta_0^W$ to the absolute value of $\sin\theta_0$, i.e., $k_0$, may be not less than 0.8 and not more than 1.0.

Figure 34:
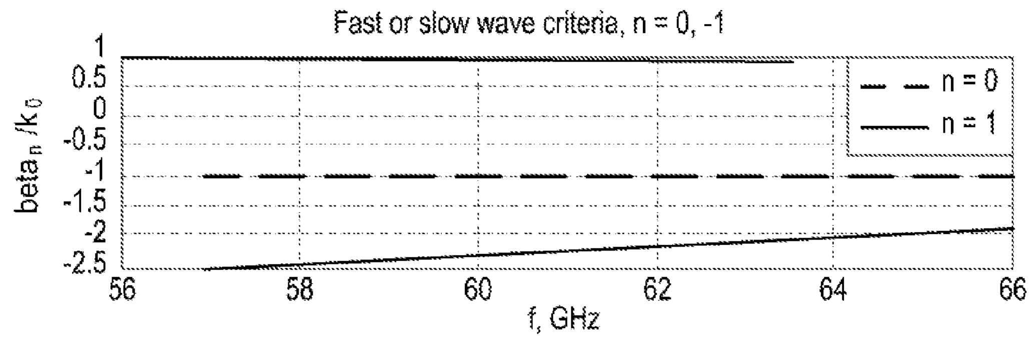
FIGS. 34 and 35 are graphs illustrating frequency dependency of propagation constants for n=0 and n=−1 in a wireless communication device and/or an electronic device according to various embodiments of the present disclosure.
Figure 35:
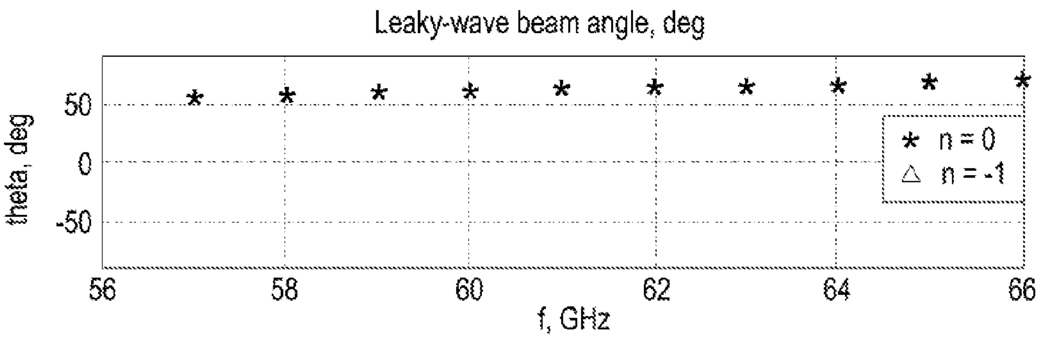

FIGS. 34 and 35 are graphs illustrating frequency dependency of propagation constants for n=0 and n=−1 in a wireless communication device and/or an electronic device according to various embodiments of the present disclosure.

Figure 36:
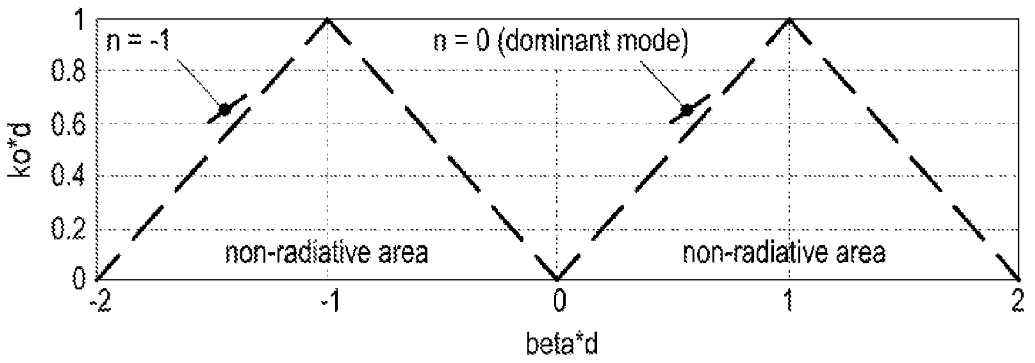
FIGS. 36 is a graph illustrating a brillouin diagram of leaky-wave modes for n=0 and n=−1 in a wireless communication device and/or an electronic device according to various embodiments of the present disclosure.

FIG. 36 is a graph illustrating a brillouin diagram of leaky-wave modes for n=0 and n=−1 in a wireless communication device and/or an electronic device according to an embodiment of the present disclosure.

Referring to FIGS. 34 and 35, FIGS. 34 and 35 show measurement results regarding the frequency dependency of propagation constants of n=0 and −1 for a rectangular waveguide (e.g., the opening 155 of FIG. 18) filled with, e.g., a dielectric. The rectangular waveguide measured is 2.9 mm long and has an effective permittivity of 1.5 and has a structure in which partial reflection surfaces (e.g., the leaky wave surface 113 of FIG. 20) are arranged at the period of 1.6 mm.

According to the above measurement results, a dormant mode n=0 supports a high-speed wave ($\beta_0^W<k_0$) propagation along the length direction, and the first spatial harmonics n=−1 are within a cutoff region $\beta_{-1}^W<-k_0$. Accordingly, the dormant mode n=0 only may be subjected to radiation. Referring to FIG. 43, a leaky-wave beam may be deflected up to 55 degrees through 75 degrees while varying on a frequency band of 57 GHz to 66 GHz.

Figure 37:
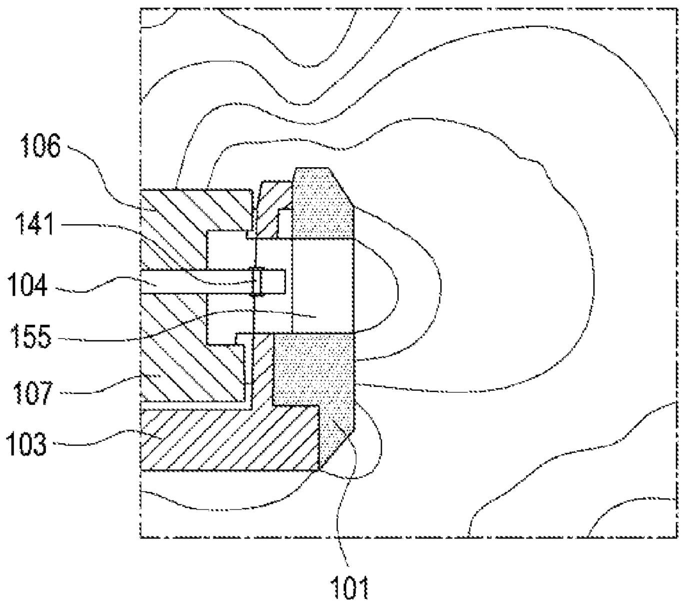
FIGS. 37 and 38 are views illustrating propagation characteristics of an antenna device having an antenna element(s) arranged between planar conductors in a wireless communication device and/or an electronic device according to various embodiments of the present disclosure.
Figure 38:
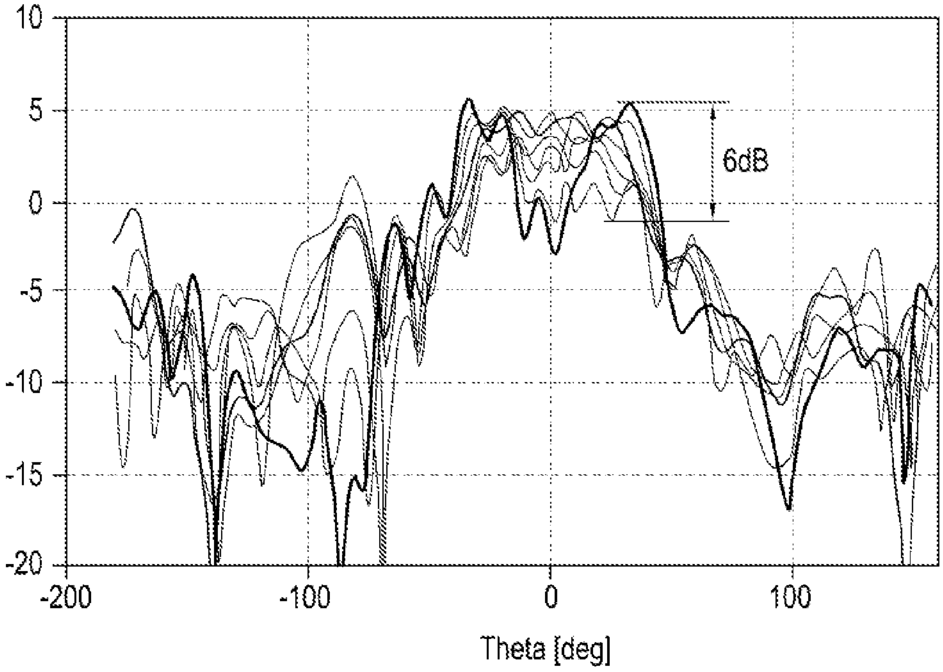

FIGS. 37 and 38 are views illustrating propagation characteristics of an antenna device having an antenna element(s) arranged between planar conductors in a wireless communication device and/or an electronic device according to various embodiments of the present disclosure.

Figure 39:
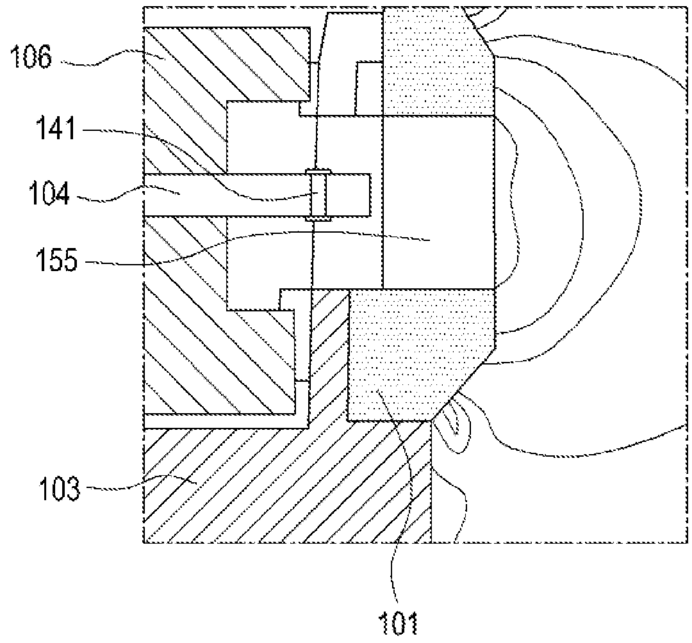
FIGS. 39 and 40 are views illustrating propagation characteristics of an antenna device having an antenna element disposed between a planar conductor and a dielectric structure in a wireless communication device and/or an electronic device according to various embodiments of the present disclosure.
Figure 40:
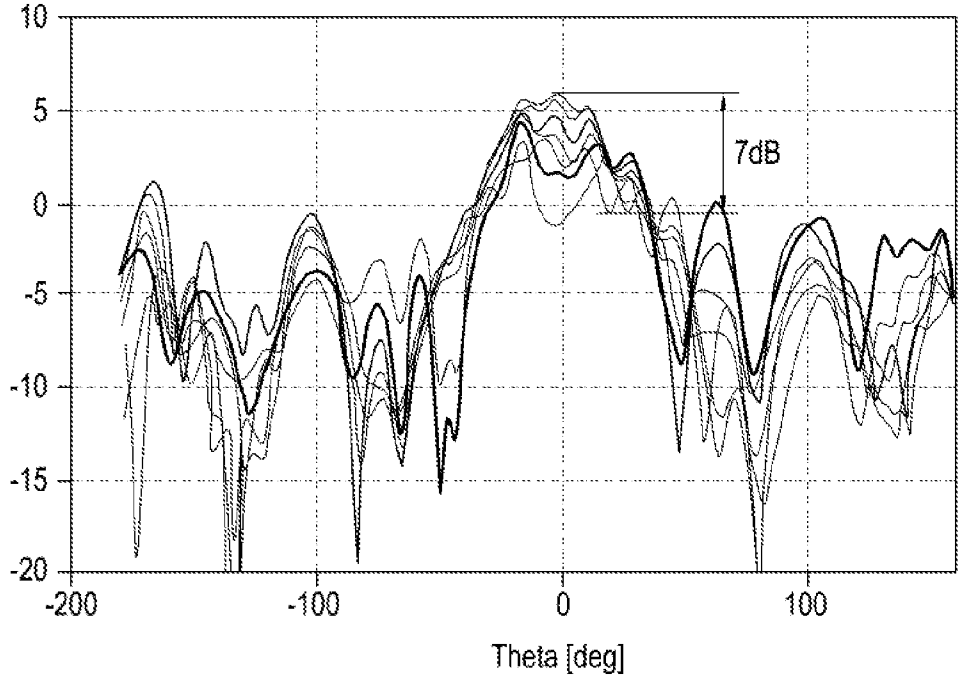

FIGS. 39 and 40 are views illustrating propagation characteristics of an antenna device having an antenna element disposed between a planar conductor and a dielectric structure in a wireless communication device and/or an electronic device according to various embodiments of the present disclosure.

Referring to FIG. 37 and/or FIG. 38, the circuit board 104 having an array 143 of antenna elements 141 formed thereon may be positioned between the first planar conductor 106 and a second planar conductor 107. In some embodiments, as shown in FIG. 39 and/or FIG. 40, the circuit board 104 may be replaced with one planar conductor and planar dielectric (e.g., the rear cover 103 of FIG. 1 or another dielectric board).

According to an embodiment of the present disclosure, the metal frame (e.g., the metal frame 101 of FIG. 1) of, e.g., the electronic device 100 may form a leaky-wave structure based on an array of openings 155 and/or a beam deflector 105 having a parasitic conductor and in combination with the cavity between the metal frame 101 and the antenna element array 143. For example, a waveguide structure(s) may be formed by the dielectric structure (array of openings 155 and/or beam deflector 105) and/or the cavity between the metal frame and the circuit board 104 (and/or antenna element(s)). The opening 155 (or dielectric structure) may separate the free space from the quasi-uniform dielectric structure of the cavity. A surface wave generated by the antenna element(s) 141, although is a bound wave, may be radiated to the free space at a discontinuous section (e.g., once a discontinuity occurs).

The cavity waveguide, e.g., the opening 155, may be regarded as a transmission line in the z-direction which is short at the bottom. When the thickness of the opening 155, e.g., $I_2$ in FIG. 22, reaches $\lambda/4/\sqrt{\varepsilon_r}$, the short circuit at the bottom may be transformed into an open circuit in the interface. In such a resonant point, the guided surface wave may efficiently be transformed into a radiation wave propagating into space. Further, the increased thickness of the opening 155 increases the ratio of the power inside the cavity waveguide over the total power, meaning that more power or electromagnetic wave energy is concentrated into the leaky-wave structure. The parasitic surface wave generated from the metal frame may distort the radiation pattern of antenna elements 141 while propagating along the circuit board 104 inside the metal frame.

In the space (the section denoted with '$\varepsilon_2$' of FIG. 22) between the metal frame 101 and the circuit board 104 formed as a portion of the waveguide structure, when $\lambda/4a/\sqrt{\varepsilon_r}$ is larger than 0.65 mm, a leaky-wave structure for efficiently radiating the surface wave into the free space may be formed by adjusting the gap between the planar conductors (e.g., the first planar conductor 106 and the second planar conductor 107 of FIG. 22).

Figure 41:
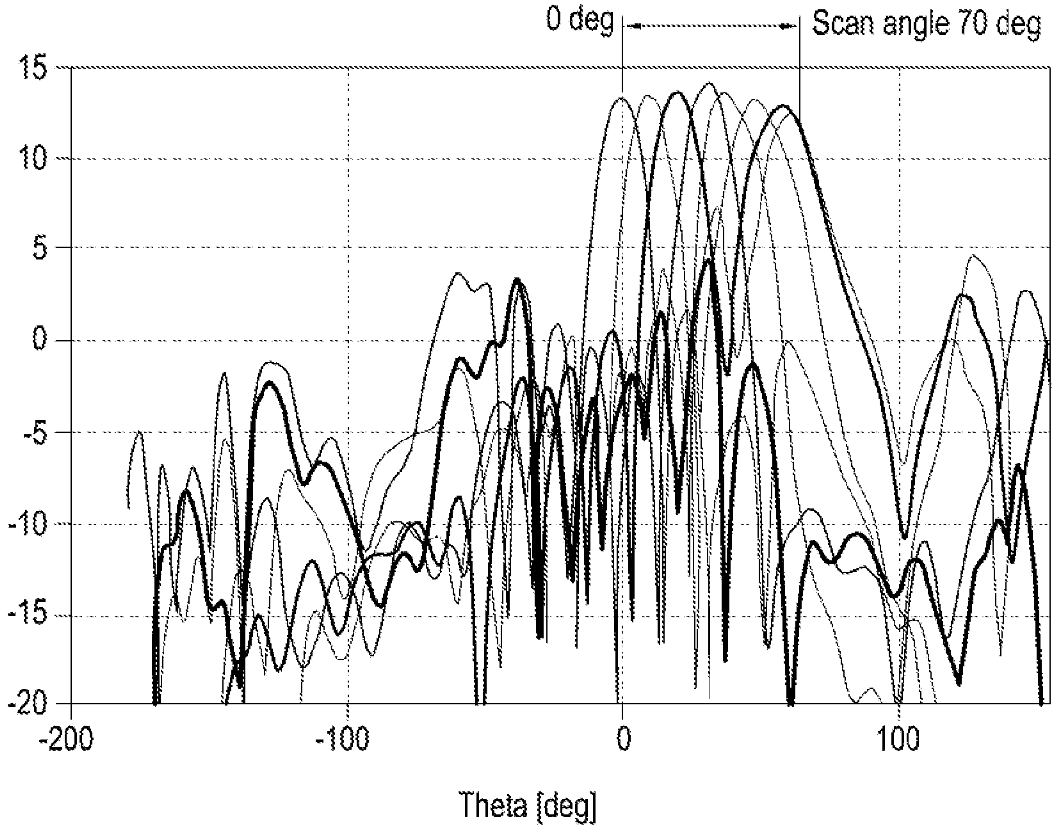
FIG. 41 is a graph illustrating the directivity on a horizontal plane and/or beamforming of an antenna device in a wireless communication device and/or an electronic device according to an embodiment of the present disclosure.

FIG. 41 is a graph illustrating the directivity on a horizontal plane and/or beamforming of an antenna device in a wireless communication device and/or an electronic device according to an embodiment of the present disclosure.

Figure 42:
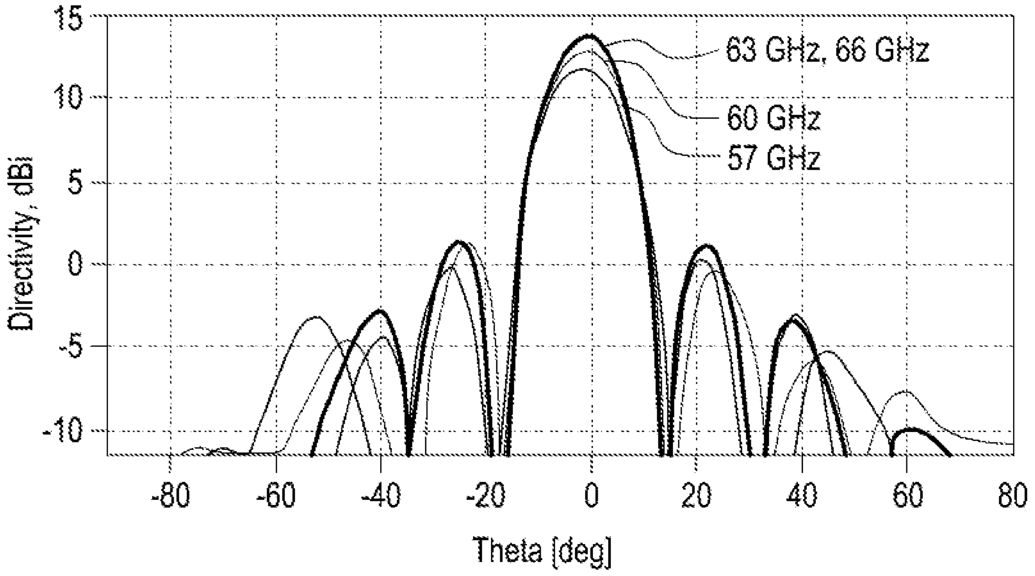
FIGS. 42 and 43 are graphs illustrating the directivity on a horizontal plane and vertical polarization beamforming of an antenna device in a wireless communication device and/or an electronic device according to various embodiments of the present disclosure.

FIGS. 42 and 43 are graphs illustrating the directivity on a horizontal plane and vertical polarization beamforming of an antenna device in a wireless communication device and/or an electronic device according to various embodiments of the present disclosure.

The radiation performance of the antenna device (including, e.g., a leaky-wave phased-array antenna) according to an embodiment of the present disclosure, as represented in graph through FIGS. 41 to 43 is set forth in Table 3 below.

TABLE 3

| | Vertical polarization | Horizontal polarization |
|---|---|---|
| Scan angle at 3 dB scan loss | +−70 angles | +−50 angles (+−80 degrees at 5 dB scan loss) |
| Directivity of center beam (θ = 0 degrees) | 12 to 13.5 dBi | 14 to 15 dBi |
| Cross deflection | less than −15 dB | less than −15 dB |
| Ripple of partial antenna patterns | less than 3 dB | less than 3 dB |
| Reflection loss | −6 to −15 dB | −6 to −15 dB |
| beamwidth in vertical plane | +−50 degrees to +−70 degrees | +−40 degrees |
| Side lobe at all scan angles | less than 5 dB | less than 3 dB |
| Beam deflection at 57 GHz to 66 GHz | +−5 degrees | +−5 degrees |

The leaky-wave phased array antenna may be used for devices such as a mobile phone, a tablet, wearables, as well as stationary devices: base-stations, routers, and other kinds of transmitters. An antenna array may be embedded into the mobile device for providing multi-gigabit communication services such as high definition television (HDTV) and ultra-high definition video (UHDV), data files sharing, movie upload/download, cloud services and other scenarios.

According to an embodiment of the present disclosure, methods for enhancing network functionality enabled by the leaky-wave phased-array antenna and/or the electronic device may include concurrent transmission (spatial reuse), a multiple-input and multiple-output (MIMO) technique, and the full-duplex technique.

According to an embodiment of the present disclosure, mmWave communication standards enabled by the leaky-wave phased-array antenna and/or the electronic device may include wireless personal area networks (WPAN) or wireless local area networks (WLAN), for example, ECMA-387, IEEE 802.15.3c, and IEEE 802.11ad.

In an embodiment, the physical layer and MAC layer may support multi-gigabit wireless applications including instant wireless sync, wireless display of high definition (HD) streams, cordless computing, and internet access. In the physical layer, two operating modes may be defined, the orthogonal frequency division multiplexing (OFDM) mode for high performance applications (e.g. high data rate), and the single carrier mode for low power and low complexity implementation.

The designated device may provide the basic timing for the basic service set and coordinate medium access to accommodate traffic requests from the mobile devices. The channel access time may be divided into a sequence of beacon intervals (BIs), and each BI may include beacon transmission interval, association beamforming training, announcement transmission interval, and data transfer interval. In beacon transmission interval, the base station may transmit one or more mmWave beacon frames in a transmit sector sweep manner Then initial beamforming training between the designated device and mobile devices, and association may be performed in association beamforming training. Contention-based access periods and service periods may be allocated within each data transfer interval by access point (AP) during announcement transmission interval. During data transfer interval, peer-to-peer communications between any pair of the mobile devices including the designated device and the mobile devices may be supported after completing the beamforming training. In IEEE 802.11ad, a hybrid multiple access of carrier sensing multiple access/collision avoidance (CSMA/CA) and time division multiple access (TDMA) may be adopted for transmissions among devices. CSMA/CA may be more suitable for bursty traffic such as web browsing to reduce latency, while TDMA may be more suitable for traffic such as video transmission to support better quality of service (QoS).

According to an embodiment of the present disclosure, antennas (e.g., antenna elements) may be arranged at, at least, one corner of the mobile device as shown in FIG. 2.

In another embodiment, the antennas may be arranged at a boundary of the mobile device (e.g., the boundary between the structure of the housing and the inner space or a side wall of the housing) as shown in FIGS. 20 to 25, FIGS. 26 and 27, and FIGS. 37 and 39.

Achievable scan range and antenna gain may be equal or better than standalone antenna module without the mobile device. Parasitic effects due to, e.g., surface current in the housing of the devices, may be suppressed or eliminated.

The proposed leaky-wave array antenna has the following advantages:

Beamforming distortions due to metal or dielectric device structures are eliminated. Thus, antenna gain is increased.

Phase-controlled beam squint-free beamforming is achievable over 16% fractional bandwidth of the array. Beam scan range better than +−70 degrees may be secured for the horizontal and/or vertical polarizations.

The array of eight antenna elements provides stable end-fire radiation beams with a realized gain over 10 dBi over the entire operating band.

The mmWave antenna array is structurally simple and conductor-backed, which is potentially useful for conformal integration into the mobile device with the metal frame.

The mmWave antenna is designed with possibility of integration into the mobile phone with a metal frame.

Antennas may be isolated or separated from environmental factors and mechanical impacts.

The mmWave antenna may satisfy mechanical tolerance and stress robustness requirements of the housing and/or the electronic device while providing a stable performance.

Structures forming a leaky-wave phased-array antenna may provide high-gain, small-sized antenna modules.

Separately operating a leaky-wave structure coupled with the antenna module may increase beamscanning range and enhance antenna gain for highly deflected beams.

The metal frame including beam deflectors may expand the beamscanning range.

According to an embodiment of the present disclosure, the leaky-wave phased-array antenna may be used as follows:

The antenna array embedded into the electronic device may be used for transmitting high-volume data, such as an unpacked high-definition (HD) video stream. For example, the user may watch a desired movie through a TV set or monitor by simply turning on the TV set or monitor and activate streaming on the user's electronic device.

Upon sharing an HD movie between users, mere activation of the data transmission function of the electronic device enables transmission of the entire movie to the opposite party's mobile device supporting such standard within two or three seconds.

Upon downloading the last movie from a kiosk, simple payment for the movie through mobile pay allows for activation of data transmission and reception of the movie in two or three seconds.

Payment in an ebook store or some digital information sharing system allows for reception of an ordered item within two or three seconds after initiating download.

According to an embodiment of the present disclosure, a leaky-wave phased-array antenna and/or an electronic device including the leaky-wave phased-antenna may be used in other various scenarios requiring transmission of high-volume data.

As described above, according to an embodiment of the present disclosure, a wireless communication device and/or an electronic device including an antenna device (e.g., a leaky-wave phased-array antenna) may include a housing having a conductive structure, a millimeter wave (mmWave) antenna module having a plurality of antenna elements, the mmWave antenna module being disposed within the housing, and a leaky-wave radiator.

The leaky-wave radiator may include at least one opening formed in the conductive structure of the housing.

An electromagnetic field generated by the mmWave antenna may be radiated outside of the housing of the wireless communication device through the leaky-wave radiator.

According to an embodiment of the present disclosure, at least one side wall of the housing includes the conductive structure.

According to an embodiment of the present disclosure, the at least one opening formed in the conductive structure of the housing may include an elongated slot formed in at least one side wall of the housing or over two adjacent side walls of the housing.

The leaky-wave radiator may further include a beam deflector inserted into the elongated slot.

According to an embodiment of the present disclosure, the beam deflector may include a synthetic resin body inserted into the elongated slot and a side face of the synthetic resin body may be exposed to the outside of the housing.

According to an embodiment of the present disclosure, the beam deflector may include a synthetic resin body and at least a parasitic conductor formed in the synthetic resin body.

A side face of the synthetic resin body may be exposed to the outside of the housing.

According to an embodiment of the present disclosure, the parasitic conductor may include a conductive pattern formed in the synthetic resin body or at least one conductive element received in the synthetic resin body.

According to an embodiment of the present disclosure, a radiation direction of the electromagnetic field may be based on selectively feeding power to the plurality of antenna elements and the at least one opening formed in the conductive structure of the housing may form an electromagnetic coupling with the plurality of antenna elements of the mmWave antenna.

According to an embodiment of the present disclosure, the electromagnetic field generated by the mmWave antenna may be radiated outside of the housing of the wireless communication device in a first direction when the wireless communication device is operating in a first beamforming mode and the electromagnetic field generated by the mmWave antenna may be radiated outside of the housing of the wireless communication device in a second direction different from the first direction when the wireless communication device is operating in a second beamforming mode.

According to an embodiment of the present disclosure, the leaky-wave radiator may include an array of a plurality of openings formed in the conductive structure in the housing.

According to an embodiment of the present disclosure, the wireless communication device may further include a first planar conductor disposed adjacent to the conductive structure of the housing and a second planar conductor disposed facing the first planar conductor and adjacent the conductive structure of the housing.

The plurality of antenna elements may be arranged facing an inner surface of a side wall of the housing and between the first planar conductor and the second planar conductor.

At least one of the first planar conductor and the second planar conductor may be at least partially surrounded by the side wall of the housing.

According to an embodiment of the present disclosure, the wireless communication device may further include a circuit board disposed between the first planar conductor and the second planar conductor.

The plurality of antenna elements may be formed on the circuit board.

According to an embodiment of the present disclosure, the wireless communication device may further include a circuit board.

The first planar conductor and the second planar conductor may be formed on two different layers of the circuit board, respectively.

The plurality of antenna elements may be formed on the circuit board adjacent to the conductive structure of the housing.

According to an embodiment of the present disclosure, the wireless communication device may further include a third planar conductor formed on the circuit board connecting the first planar conductor with the second planar conductor.

The first planar conductor, the second planar conductor, and the third planar conductor may form a waveguide at least partially surrounding an array of the plurality of antenna elements.

According to an embodiment of the present disclosure, the circuit board may be formed of any one of a printed circuit board (PCB) and a low temperature co-fired ceramic (LTCC) board.

According to an embodiment of the present disclosure, the plurality of antenna elements may be formed in a portion of the circuit board positioned adjacent to an edge of the circuit board, and the portion of the circuit board positioned adjacent to the edge of the circuit board may function as a dielectric transformer matching the plurality of antenna elements.

According to an embodiment of the present disclosure, a wireless communication device and/or an electronic device including an antenna device (e.g., a leaky-wave phased-array antenna) may include a housing including a conductive structure, the conductive structure having at least one opening, a circuit board having at least a portion disposed adjacent to the conductive structure in the housing, and a plurality of antenna elements disposed on the circuit board.

The plurality of antenna elements may correspond to the at least one opening in the conductive structure of the housing.

An electromagnetic field generated by the plurality of antenna elements may be radiated outside of the housing through the at least one opening in the conductive structure of the housing.

According to an embodiment of the present disclosure, the conductive structure may include a plurality of openings and the plurality of opening included in the conductive structure forms a leaky-wave radiator to radiate the electromagnetic field outside of the housing.

According to an embodiment of the present disclosure, the wireless communication device and/or the electronic device may further include a beam deflector inserted into the at least one opening.

The beam deflector may include a dielectric body.

The at least one opening may be an elongated slot.

According to an embodiment of the present disclosure, the at least one opening may include an acoustic hole.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The foregoing detailed description of the certain exemplary embodiments has been provided for the purpose of explaining the principles of the embodiments and practical application, thereby enabling others skilled in the art to understand the various embodiments and with various modifications as are suited to the particular use contemplated. This description is not necessarily intended to be exhaustive or to limit the precise embodiments disclosed. The specification describes specific examples to accomplish a more general goal that may be accomplished in another way. Those skilled in the art will appreciate that the features described above can be combined in various ways to form multiple variations.

What is claimed is:

1. A wireless communication device, comprising:

a housing configured to include a conductive structure;

a millimeter wave (mmWave) antenna configured to include a plurality of antenna elements, the mmWave antenna configured to be disposed within the housing;

a leaky-wave radiator configured to include at least one opening formed in the conductive structure of the housing, the leaky-wave radiator configured to operate as a leaky-wave antenna structure by being coupled with an electromagnetic field generated by the mmWave antenna;

a synthetic resin body configured to be inserted into the at least one opening; and at least one parasitic conductor configured to be formed in the synthetic resin body, wherein a side face of the synthetic resin body is configured to be exposed to the outside of the housing, and wherein the electromagnetic field generated by the mmWave antenna is radiated outside of the housing of the wireless communication device through the leaky-wave radiator.

2. The wireless communication device of claim 1, wherein at least one side wall of the housing is configured to include the conductive structure.

3. The wireless communication device of claim 1, wherein the at least one opening formed in the conductive structure of the housing is an elongated slot formed in at least one side wall of the housing or over two adjacent side walls of the housing, and wherein the synthetic resin body is configured to form a beam deflector in the elongated slot.

4. The wireless communication device of claim 3, wherein a radiation direction of the electromagnetic field is based on selectively feeding power to the plurality of antenna elements, and wherein the at least one opening formed in the conductive structure of the housing is configured to form an electromagnetic coupling with the plurality of antenna elements of the mmWave antenna.

5. The wireless communication device of claim 1, wherein the parasitic conductor is configured to include a conductive pattern formed in the synthetic resin body or at least one conductive element received in the synthetic resin body.

6. The wireless communication device of claim 1, wherein the wireless communication device is configured to operate in at least one beamforming mode of an array mode using an array of the antenna elements, a leaky-wave mode using the leaky-wave radiator, and a mixed mode implementing a combination of the array mode and the leaky-wave mode.

7. The wireless communication device of claim 1, wherein the leaky-wave radiator is further configured to include an array of a plurality of openings formed in the conductive structure of the housing.

8. The wireless communication device of claim 1, further comprising:

a first planar conductor configured to be disposed adjacent to the conductive structure of the housing; and a second planar conductor configured to be disposed facing the first planar conductor and adjacent the conductive structure of the housing, wherein the plurality of antenna elements is configured to be arranged facing an inner surface of a side wall of the housing and between the first planar conductor and the second planar conductor.

9. The wireless communication device of claim 8, wherein at least one of the first planar conductor and the second planar conductor is at least partially surrounded by the side wall of the housing.

10. The wireless communication device of claim 8, further comprising:

a circuit board configured to be disposed between the first planar conductor and the second planar conductor, wherein the plurality of antenna elements is formed on the circuit board.

11. The wireless communication device of claim 8, further comprising:

a circuit board, wherein the first planar conductor and the second planar conductor are formed on two different layers of the circuit board, respectively, and wherein the plurality of antenna elements is formed on the circuit board adjacent to the conductive structure of the housing.

12. The wireless communication device of claim 11, further comprising:

a third planar conductor formed on the circuit board, the third planar conductor connecting the first planar conductor with the second planar conductor, wherein the first planar conductor, the second planar conductor, and the third planar conductor are configured to form a waveguide at least partially surrounding an array of the plurality of antenna elements.

13. The wireless communication device of claim 11, wherein the circuit board is formed of any one of a printed circuit board (PCB) and a low temperature co-fired ceramic (LTCC) board.

14. The wireless communication device of claim 11, wherein the plurality of antenna elements is formed in a portion of the circuit board positioned adjacent to an edge of the circuit board, and wherein the portion of the circuit board positioned adjacent to the edge of the circuit board is configured to function as a dielectric transformer matching the plurality of antenna elements.

15. An electronic device, comprising:

a housing configured to include a conductive structure, the conductive structure having at least one opening;

a circuit board configured to include at least a portion disposed adjacent to the conductive structure in the housing;

a plurality of antenna elements configured to be disposed on the circuit board;

a synthetic resin body configured to be inserted into the at least one opening; and at least one parasitic conductor configured to be formed in the synthetic resin body, wherein a side face of the synthetic resin body is configured to be exposed to the outside of the housing, wherein the plurality of antenna elements corresponds to the at least one opening in the conductive structure of the housing, wherein the at least one opening in the conductive structure of the housing is configured to operate as a leaky-wave antenna structure by being coupled with electromagnetic field generated by the plurality of antenna elements, and wherein an electromagnetic field generated by the plurality of antenna elements is radiated outside of the housing through the at least one opening in the conductive structure of the housing.

16. The electronic device of claim 15, wherein the conductive structure is configured to include a plurality of the openings, and wherein the plurality of openings included in the conductive structure forms a leaky-wave radiator to radiate the electromagnetic field outside of the housing.

17. The electronic device of claim 15, wherein the synthetic resin body is configured to form a beam deflector.

18. The electronic device of claim 15, wherein the at least one opening is configured to include an acoustic hole.

* * * * *